United States Patent [19]

Ehrenberg et al.

[11] Patent Number: 5,834,601
[45] Date of Patent: Nov. 10, 1998

[54] WATER-SOLUBLE FIBER-REACTIVE DYES, PROCESS FOR THEIR PREPARATION, AND THEIR USE

[75] Inventors: Stefan Ehrenberg, Frankfurt; Christian Schumacher, Kelkheim, both of Germany

[73] Assignee: Dystar Textilfarben GmbH & Co. Deutschland KG, Germany

[21] Appl. No.: 953,313

[22] Filed: Oct. 17, 1997

[30] Foreign Application Priority Data

Oct. 21, 1996 [DE] Germany ............... 196 43 306.1

[51] Int. Cl.⁶ .................................... C09B 62/04
[52] U.S. Cl. ................ 534/618; 534/635; 540/126; 544/76; 544/189
[58] Field of Search .................. 534/635, 618; 540/126; 544/76, 189

[56] References Cited

U.S. PATENT DOCUMENTS

| 5,200,512 | 4/1993 | Reiher ........................ 534/635 |
| 5,539,088 | 7/1996 | Schumacher et al. ............ 534/633 |
| 5,576,445 | 11/1996 | Herzig et al. ................ 548/477 |

FOREIGN PATENT DOCUMENTS

| 0 493 759 | 8/1992 | European Pat. Off. . |
| 0 675 172 | 4/1995 | European Pat. Off. . |
| 0 685 464 | 6/1995 | European Pat. Off. . |
| 0 733 680 | 9/1996 | European Pat. Off. . |
| 57-199878 | 12/1982 | Japan . |

*Primary Examiner*—Fiona T. Powers
*Attorney, Agent, or Firm*—Connolly & Hutz

[57] ABSTRACT

Dyes of the formula (1) indicated and defined below, containing at least one sulfo group, which can be used for dyeing hydroxy and/or carboxamido-containing material, especially fiber material, for example cellulosic fiber materials, wool and synthetic polyamide.

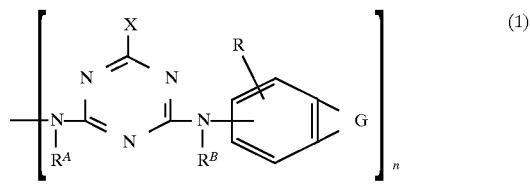

in which F is the radical of a dye molecule, n is the number 1 or 2, $R^A$ is hydrogen or substituted or unsubstituted lower alkyl, $R^B$ is hydrogen, unsubstituted or substituted lower alkyl or unsubstituted or substituted phenyl, X is halogen, R is hydrogen, lower alkyl, lower alkoxy halogen or sulfo, and G at the benzene ring forms the radical of a heterocycle which includes at least one carbonylamido group whose N atom can be substituted.

20 Claims, No Drawings

WATER-SOLUBLE FIBER-REACTIVE DYES, PROCESS FOR THEIR PREPARATION, AND THEIR USE

DESCRIPTION

The invention is in the technical field of fiber-reactive dyes.

The present invention relates to novel fiber-reactive dyes of the formula (1)

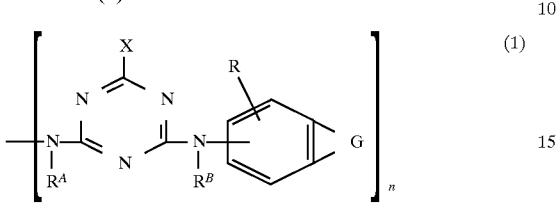

in which:

F is the radical of a sulfo-containing mono-, dis- or polyazo dye, such as a trisazo dye, or of a heavy metal complex mono-, dis- or trisazo dye or of an anthraquinone, azomethine, phenazine, stilbene, triphenylmethane, xanthene, thioxanthene, nitroaryl, naphthoquinone, pyrenequinone, perylenetetracarbimide, formazan, copper formazan, phthalocyanine, copper phthalocyanine, nickel phthalocyanine or cobalt phthalocyanine dye or triphendioxazine dye;

n is the number 1 or 2, preferably 1;

$R^A$ is hydrogen or alkyl of 1 to 4 C atoms, such as methyl and ethyl, which can be substituted by halogen, such as chlorine and bromine, by hydroxy, cyano, alkoxy of 1 to 4 C atoms, such as methoxy and ethoxy, by alkoxycarbonyl of 2 to 5 C atoms, such as carboethoxy and carbomethoxy, by carboxy, sulfamoyl, sulfo, sulfato or phosphato, and is preferably methyl or ethyl and, with particular preference, hydrogen;

$R^B$ is hydrogen or alkyl of 1 to 6 C atoms, preferably of 1 to 4 C atoms, especially methyl or ethyl, which can be substituted by halogen, such as chlorine and bromine, by hydroxy, cyano, alkoxy of 1 to 4 C atoms, such as methoxy and ethoxy, by alkoxycarbonyl of 2 to 5 C atoms, such as carbomethoxy and carboethoxy, by carboxy, sulfamoyl, sulfo, sulfato, phosphato, phenyl or sulfophenyl, or is phenyl which can be substituted by 1, 2 or 3, preferably 1 or 2, substituents from the group consisting of halogen, such as chlorine and bromine, alkyl of 1 to 4 C atoms, such as methyl, alkoxy of 1 to 4 C atoms, such as methoxy and ethoxy, sulfo and carboxy, preferably of methyl, methoxy and sulfo, and is preferably hydrogen;

X is halogen, such as fluorine and chlorine;

R is hydrogen, alkyl of 1 to 4 C atoms, such as ethyl and especially methyl, alkoxy of 1 to 4 C atoms, such as ethoxy and especially methoxy, halogen, such as chlorine or bromine, or sulfo, preferably hydrogen;

G forms at the benzene ring the radical of a heterocycle which includes at least one carboxamide group of the formula —CO—N($R^{10}$)— in which $R^{10}$ is hydrogen, alkyl of 1 to 4 C atoms, such as methyl and ethyl, or is aryl of 6 to 10 C atoms such as phenyl or naphthyl, which is unsubstituted or substituted by 1 to 3 substituents from the group consisting of sulfo, carboxy, alkoxy of 1 to 4 C atoms, such as methoxy, alkyl of 1 to 4 C atoms, such as methyl, halogen, such as chlorine, cyano, nitro and amino, and the heterocycle may possess 1 or 2 further hetero-groups from the series consisting of —O—, —S— and —N($R^{10}$)— where $R^{10}$ has the abovementioned meaning, and G is preferably a group of the formula (a), (b), (c), (d), (e), (f), (g), (h) or (j)

 (a)

 (b)

 (c)

 (d)

 (e)

 (f)

 (g)

 (h)

 (j)

in which $R^{10}$ has the abovementioned meaning, the index a in formula (g) is the number 1 or 2, and $R^y$ is hydrogen or alkyl of 1 to 4 C atoms, such as ethyl and especially methyl, which can be substituted by alkoxy of 1 to 4 C atoms, such as ethoxy and methoxy, by carboxy, sulfo, sulfato or phosphato, or is phenyl or naphthyl;

the compounds of the formula (1) possess at least one, preferably two or more, such as two, three, four or five, sulfo group(s).

Both in the formulae mentioned above and in those below the individual formula members, both with different and with the same designation within a formula, can within the scope of their definition have meanings which are the same as or different from one another.

The radical $R^{10}$ is preferably methyl, ethyl, phenyl, monosulfophenyl, disulfophenyl, trisulfophenyl, naphthyl, monosulfonaphthyl, disulfonaphthyl or trisulfonaphthyl and, with particular preference, hydrogen.

Of the abovementioned radicals of the formulae (a) to (j) the preferred ones are those of the formulae (a), (b), (c), (f), (e) and (h).

F is preferably the radical of a mono- or disazo dye or the radical of a heavy metal complex azo dye, such as a 1:2 chromium complex, 1:2 cobalt complex and, in particular, an o,o'-1:2 copper complex monoazo or disazo dye or the radical of an anthraquinone or copper formazan dye, a nickel or copper phthalocyanine dye or triphendioxazine dye.

The dye radical F possesses one or more, such as 2 to 6, sulfo groups. The radical F may comprise further substituents which are customary in organic dyes. Examples of such substituents are: alkyl groups of 1 to 4 C atoms, such as methyl, ethyl, propyl, isopropyl or butyl, of these preferably ethyl and especially methyl; alkoxy groups of 1 to 4 C atoms, such as methoxy, ethoxy, propoxy, isopropoxy and butoxy, of these preferably ethoxy and especially methoxy; alkanoylamino groups of 2 to 5 C atoms, such as the acetylamino and propionylamino group; unsubstituted or sulfo-, carboxy-, methyl-, ethyl-, methoxy-, ethoxy- and/or chlorine-substituted benzoylamino groups; primary and mono- or disubstituted amino groups, the substituents being, for example, alkyl groups of 1 to 4 C atoms and/or phenyl groups, such as monoalkylamino and dialkylamino groups having 1 to 4 C atoms in the alkyl radical, phenylamino or N-($C_1$–$C_4$-alkyl)-N-phenylamino groups, where the alkyl radicals can also be substituted, for example by phenyl, sulfophenyl, hydroxy, sulfato, sulfo and carboxy and the phenyl groups can also be substituted, such as by chlorine, sulfo, carboxy, methyl and/or methoxy, for example methylamino, ethylamino, propylamino, isopropylamino, butylamino, N,N-di-(β-hydroxyethyl)-amino, N,N-di-(β-sulfatoethyl)amino, sulfobenzylamino, N,N-di-(sulfobenzyl)amino and diethylamino groups and also phenylamino and sulfophenylamino groups; alkoxycarbonyl groups having an alkyl radical of 1 to 4 C atoms, such as methoxycarbonyl and ethoxycarbonyl; alkylsulfonyl groups of 1 to 4 C atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl of 1 to 4 C atoms, it being possible for the alkyl radicals in turn to be substituted, for example by hydroxy, sulfato, sulfo, carboxy, phenyl and sulfophenyl, for example N-methylcarbamoyl and N-ethylcarbamoyl; sulfamoyl groups, which can be mono- or disubstituted by alkyl groups of 1 to 4 C atoms, and N-phenyl-N-alkylsulfamoyl groups having an alkyl group of 1 to 4 C atoms, it being possible for these alkyl groups in turn to be substituted by hydroxy sulfato, sulfo, carboxy, phenyl and sulfophenyl, for example N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di-(β-hydroxyethyl) sulfamoyl; N-phenylsulfamoyl, ureido, hydroxy, carboxy, sulfomethyl and sulfo groups. The dye radical F can also have one or two fiber-reactive groups of the formula Y—$SO_2$—$W^O$— in which $W^O$ is an alkylene radical of 1 to 4 C atoms or an amino group of the formula —N($CH_3$)— or —N($C_2H_5$)— or a group of the formula —($C_2$–$C_4$-alkylene)-NH— or is a direct covalent bond and Y is vinyl or β-sulfatoethyl, β-thiosulfatoethyl, β-phosphatoethyl, β-($C_2$–$C_5$-alkanoyloxy)ethyl, such as β-acetyloxyethyl, β-benzoyloxyethyl, β-(sulfobenzoyloxy)ethyl, β-(p-toluenesulfonyloxy)ethyl or β-haloethyl, such as β-bromoethyl or β-chloroethyl, and preferably vinyl and, with particular preference, β-chloroethyl or β-sulfatoethyl.

The groups "sulfo", "thiosulfato", "carboxy", "phosphato" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphato groups are groups of the formula —$OPO_3M_2$ and sulfato groups are groups of the formula —$OSO_3M$, in which M is hydrogen or an alkali metal, such as sodium, potassium or lithium, or the mole equivalent of an alkaline earth metal, such as of calcium, and is preferably hydrogen or an alkali metal.

Important azo dyes of the formula (1) are those in which F is the radical of a dye of the benzene-azo-naphthol, of the benzene-azo-1-phenyl-5-pyrazolone, of the benzene-azo-benzene, of the naphthalene-azo-benzene, of the benzene-azo-aminonaphthalene, of the naphthalene-azo-naphthalene, of the naphthalene-azo-1-phenyl-5-pyrazolone, of the benzene-azo-pyridone and of the naphthalene-azo-pyridone series, containing at least one sulfo group. Of the novel 1:1 copper complex azo dyes, preference is given to those of the benzene and naphthalene series.

Preferred mono- and disazo dyes of the formula (1) are, for example, those of the formulae (3a), (3b) and (3c)

$$D^1\text{-N=N-(E-N=N)}_v\text{-}K^2\text{-Z} \tag{3a}$$

$$Z\text{-}D^2\text{-N=N-(E-N=N)}_v\text{-}K^1 \tag{3b}$$

$$Z\text{-}D^2\text{-N=N-(E-N=N)}_v\text{-}K^2Z \tag{3c}$$

and the heavy metal complex compounds derived therefrom, such as 1:1 copper complex compounds, in which $D^1$ is the radical of a diazo component of the benzene or naphthalene series, $D^2$ is the radical of a diazo component of the diaminobenzene or diaminonaphthalene series, E is the radical of a middle component of the benzene or naphthalene series, $K^1$ is the radical of a coupling component of benzene, naphthalene, pyrazolone, 6-hydroxy-2-pyridone or acetoacetarylamide series, $K^2$ is the bivalent radical of a coupling component of the aniline, aminonaphthalene, acetoacet(aminoaryl)amide or 1-aminophenyl-pyrazolone series, where $D^1$, $D^2$, E, $K^1$ and $K^2$ can comprise one or more of the substituents specified for F, the radicals $D^1$, $D^2$, E, $K^1$ and $K^2$ together having at least one, preferably at least two, sulfo groups, v is the number zero or 1, and Z is a group of the formula (2)

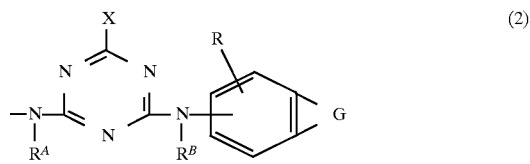

in which $R^A$, $R^B$, X, R and G have the abovementioned meanings.

Preference is also given to disazo dyes of the formula (3d) and (3e)

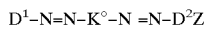 (3d)

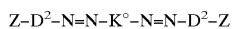 (3e)

in which Z, $D^1$ and $D^2$ have the abovementioned meanings and K° is the radical of a divalent coupling component of the naphthalene series, where $D^1$, $D^2$ and K° can contain the substituents specified for F, and where $D^1$, $D^2$ and K° together include at least one sulfo group.

Azo dyes of the formulae (3d) and (3e) are, in particular, dyes of the formula (3f)

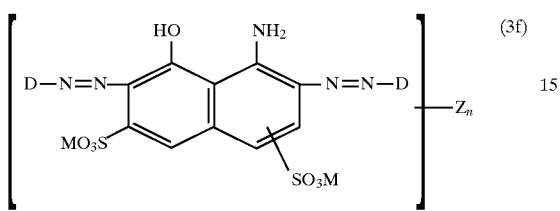 (3f)

in which n has the abovementioned meaning,

M is hydrogen or alkali metal, such as sodium, potassium or lithium, or the mole equivalent of an alkaline earth metal, such as of calcium, Z is a radical of the formula (2) which if n is 1 is on one of the radicals D and if n is 2 is attached to both Ds, and D at each occurrence is as defined for $D^1$ or $D^2$ depending on whether the radical Z is attached to D.

Of the 1:1 copper complex azo dyes attention should be drawn, for example, to those of the formula (3g) and (3h)

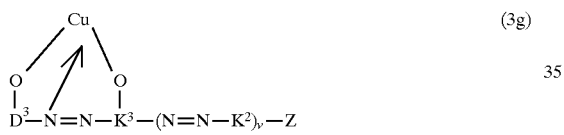 (3g)

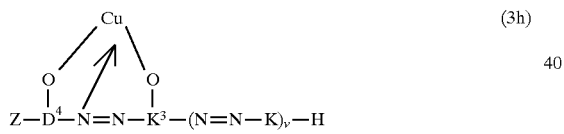 (3h)

in which

Z, $K^2$ and v have the abovementioned meanings, $D^4$ is the radical of a diazo component which ortho to the azo group contains the copper complex-binding oxy group, and $K^3$ is the radical of a coupling component which ortho or vicinally to the azo group possesses the carbo complex-binding oxy group, and K is the bivalent radical of a coupling component.

Aromatic radicals of diazo components which carry no fiber-reactive group of the formula (2), such as of those diazo components that are of the formulae $D^1$—$NH_2$ and $D^3$—$NH_2$, are, for example, those of the formulae (4a), (4b), (5a) and (5b)

 (4a)

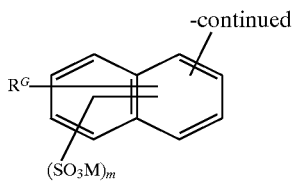 (4b)

 (5a)

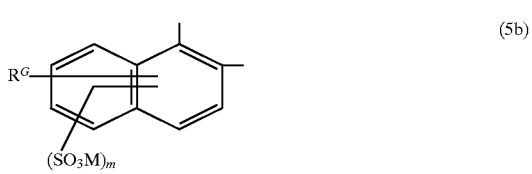 (5b)

in which $R^G$ is hydrogen, sulfo or a group of the formula Y—$SO_2$—W°— where W° and Y are as defined above, $P^1$ is hydrogen, methyl, ethyl, methoxy, ethoxy, alkanoyl of 2 to 5 C atoms, such as acetyl and propionyl, cyano, sulfo, carboxy, alkoxycarbonyl of 2 to 5 C atoms, such as methoxycarbonyl and ethoxycarbonyl, carbamoyl, N-($C_1$–$C_4$-alkyl)carbamoyl, fluorine, chlorine, bromine or trifluoromethyl, $P^2$ is hydrogen, methyl, ethyl, methoxy, ethoxy, cyano, nitro, carboxy, sulfo, chlorine, alkanoylamino of 2 to 5 C atoms, such as acetylamino, alkoxycarbonyl of 2 to 5 C atoms, such as methoxycarbonyl and ethoxycarbonyl, carbamoyl, N-($C_1$–$C_4$-alkyl) sulfamoyl, sulfophenylamidocarbonyl, phenylamidocarbonyl, alkylsulfonyl of 1 to 4 C atoms, phenylsulfonyl or phenoxy, where the benzene ring in formulae (4a) and (4b) can additionally contain a hydroxy group ortho to the free bond leading to the azo group, m is the number zero, 1 or 2 (and if m is zero, this group is a hydrogen atom), and M has the abovementioned meaning.

Of these, preferably $P^1$ is hydrogen, methyl, methoxy, bromine, chlorine, sulfo and carboxy and $P^2$ is hydrogen, methyl, methoxy, chlorine, carboxy, sulfo and acetylamino.

Examples of groups of the formulae (4a) and (4b) are: phenyl, 2-methylphenyl, 3- and 4-methylphenyl, 2-methoxyphenyl, 3- and 4-methoxyphenyl, 2-chlorophenyl, 3- and 4-chlorophenyl, 2,5-dichlorophenyl, 2,5-dimethylphenyl, 2-methoxy-5-methyl-phenyl, 2-methoxy-4-nitrophenyl, 4-phenylphen-1-yl, 3-phenoxyphenyl, 2-sulfamoylphenyl, 3- and 4-sulfamoylphenyl, 2-, 3- and 4-(N-methyl-sulfamoyl)-, -(N-ethylsulfamoyl)-,-(N,N-dimethylsulfamoyl)- and -(N, N-diethylsulfamoyl)phenyl, 2-sulfo-5-trifluoromethylphenyl, 2-nitro-phenyl, 3- and 4-nitrophenyl, 3-acetylaminophenyl, 4-acetylamino-phenyl, 2-carboxyphenyl, 4-carboxyphenyl, 3-carboxyphenyl, 3-chloro-6-carboxyphenyl, 2-sulfophenyl, 3-sulfophenyl, 4-sulfophenyl, 2,5-disulfophenyl, 2,4-disulfophenyl, 3,5-disulfophenyl, 2-methyl-5-sulfophenyl, 2-methoxy-5-sulfophenyl, 2-methoxy-4-sulfophenyl, 2-sulfo-5-methylphenyl, 2-methyl-4-sulfophenyl, 3-sulfo-4-methoxy-phenyl, 5-sulfo-2-ethoxyphenyl, 4-sulfo-2-ethoxyphenyl, 2-carboxy-5-sulfophenyl, 2-carboxy-4-sulfophenyl, 2,5- dimethoxy-4-sulfophenyl, 2,4-dimethoxy-5-sulfophenyl, 2-methoxy-5-methyl-4-sulfophenyl, 2-sulfo-4-methoxyphenyl, 2-sulfo-4-methylphenyl, 2-methyl-4-sulfo-phenyl, 2-chloro-4-sulfophenyl, 2-chloro-5-sulfophenyl, 2-bromo-4-sulfophenyl, 2,6-dichloro-4-sulfophenyl, 2-sulfo-4- and -5-chloro-phenyl, 2-sulfo-4,5-dichlorophenyl, 2,5-dichloro-6-sulfophenyl, 2,5-dichloro-4-sulfophenyl, 2-sulfo-5-chloro-4-methylphenyl, 2-sulfo-4-chloro-5-methylphenyl, 2-sulfo-5-methoxyphenyl, 2-methoxy-5-sulfo-phenyl, 2-methoxy-4-sulfophenyl, 2,4-dimethoxy-6-sulfophenyl, 2-sulfo-5-acetylamino-4-methylphenyl, 2-methyl-4,6-disulfophenyl, 2,5-disulfo-4-methoxyphenyl, 2-sulfo-5-nitrophenyl, 2-sulfo-4-nitrophenyl, 2,6-dimethyl-3-sulfophenyl, 2,6-dimethyl-4-sulfophenyl, 3-acetylamino-6-sulfophenyl, 4-acetylamino-2-sulfophenyl, 4-sulfonaphth-1-yl, 3-sulfo-naphth-1-yl, 5-sulfonaphth-1-yl, 6-sulfonaphth-1-yl, 7-sulfonaphth-1-yl, 8-sulfonaphth-1-yl, 3,6-disulfo- and 5,7-disulfonaphth-1-yl, 3,7-disulfo-naphth-1-yl, 3,6,8-trisulfonaphth-1-yl, 4,6,8-trisulfonaphth-1-yl, 5-sulfonaphth-2-yl, 6-or 8-sulfonaphth-2-yl, 3,6,8-trisulfonaphth-2-yl, 1, 5,7-trisulfonaphth-2-yl, 1,7-disulfonaphth-2-yl, 5,7-disulfonaphth-2-yl, 2,5,7-trisulfonaphth- 1 -yl, 4,6,8-trisulfonaphth-2-yl, 6,8-disulfo-naphth-2-yl, 1,6-disulfonaphth-2-yl, 1-sulfonaphth-2-yl, 1,5-disulfo-naphth-2-yl, 3,6-disulfonaphth-2-yl, 4,8-disulfonaphth-2-yl, 2-hydroxy-5-sulfophenyl, 2-hydroxy-4-sulfophenyl, 2-hydroxy-3,5-disulfophenyl, 2-hydroxy-5-acetylamino-3-sulfophenyl, 2-hydroxy-3-acetylamino-4-sulfophenyl, 2-hydroxy-5-chloro-4-sulfophenyl, 2-hydroxy-5-methylsulfonylphenyl, 2-hydroxy-6-nitro-4-sulfonaphth-1-yl and 1-hydroxy-4,8-disulfonaphth-2-yl, 2-(β-sulfatoethylsulfonyl)phenyl, 3-(β-sulfatoethylsulfonyl)phenyl, 4-(β-sulfatoethylsulfonyl)phenyl, 2-carboxy-5-(β-sulfatoethylsulfonyl)phenyl, 2-chloro-3-(sulfatoethylsulfonyl)phenyl, 2-chloro-4-(β-sulfatoethylsulfonyl)phenyl, 2-bromo-4-(β-sulfatoethylsulfonyl)phenyl, 4-methoxy-3-(β-sulfatoethylsulfonyl)-phenyl, 4-chloro-3(β-sulfatoethylsulfonyl)phenyl, 2-ethoxy-4- or -5-(β-sulfatoethylsulfonyl)phenyl, 2-methyl-4-(β-sulfatoethylsulfonyl)-phenyl, 2-methoxy-5- or -4-(β-sulfatoethylsulfonyl)phenyl, 2,4-diethoxy-5-(β-sulfatoethylsulfonyl)phenyl, 2,4-dimethoxy-5-(β-sulfatoethylsulfonyl)phenyl, 2,5-dimethoxy-4-(β-sulfatoethylsulfonyl)phenyl, 2-methoxy-5-methyl-4-(β-sulfatoethylsulfonyl)phenyl, 2- or 3- or 4-(β-thiosulfatoethylsulfonyl)phenyl, 2-methoxy-5-(β-thiosulfato-ethylsulfonyl)phenyl, 2-sulfo-4-(β-phosphatoethylsulfonyl)phenyl, 2-sulfo-4-vinylsulfonylphenyl, 2-hydroxy-4- or -5-(β-sulfatoethylsulfonyl)phenyl, 2-chloro-4- or -5-(β-chloroethylsulfonyl)phenyl, 2-hydroxy-5-(β-sulfatoethylsulfonyl)-phenyl, 2-hydroxy-3-sulfo-5-(β-sulfatoethylsulfonyl)phenyl, 3- or 4-(β-acetoxyethylsulfonyl)phenyl, 6-carboxy-1-sulfonaphth-2-yl, 5-(β-sulfato-ethylsulfonyl)naphth-2-yl, 6- or 7- or 8-(β-sulfatoethylsulfonyl)naphth-2-yl, 6-(β-sulfatoethylsulfonyl)- 1 -sulfo-naphth-2-yl, 5-(β-sulfatoethylsulfonyl)-1-sulfonaphth-2-yl, 8-(β-sulfatoethylsulfonyl)-6-sulfonaphth-2-yl, 4-[N-methyl-N-(β-sulfatoethylsulfonyl)]aminophenyl, 3-[N-methyl-N-(β-sulfatoethylsulfonyl)]aminophenyl, 4-[β-(β'-sulfatoethylsulfonyl)-ethyl]phenyl, 3- or 4-[β-(β'-chloroethylsulfonyl)ethylamino]phenyl, 3- or 4-[β-(β'-sulfatoethylsulfonyl)ethylamino]phenyl, 3- or 4-[γ-(β'-chloro-ethylsulfonyl)propylamino]phenyl, 3- or 4-[γ-(β'-sulfatoethylsulfonyl)-propylamino]phenyl, 3- or 4-[γ-(vinylsulfonyl)-propylamino]phenyl, 4-[β-(β'-sulfatoethylsulfonyl)ethylamino]-2- or -3-sulfophenyl, 4-[β-(β'-chloroethyl-sulfonyl)ethylamino]-2- or -3-sulfo-phenyl, 4-[γ-(β'-sulfatoethylsulfonyl)-propylamino]-2- or -3-sulfophenyl, 4-[γ-(β'-chloroethylsulfonyl)propylamino]-2- or -3-sulfophenyl, 4-[β-(β'-chloroethylsulfonyl)ethylamino]-2-carboxy-phenyl, 4-[β-(β'-sulfatoethylsulfonyl)ethylamino]-2-carboxyphenyl, 4-[γ-(β'-chloro-ethylsulfonyl)propylamino]-2-carboxyphenyl and 4-[γ-(β'-sulfatoethylsulfonyl)propylamino]-2-carboxyphenyl.

Groups conforming to the formula radicals D—N=N—E— and $D^1$—N=N—E— are, for example, 4-(4'-sulfophenyl)azo-2-sulfophenyl, 4-(2',4'-disulfo-phenyl)azo-2-methoxy-5-methylphenyl, 4-(2',5'-disulfophenyl)azo-2-methyl-5-methoxyphenyl, 4-(3',6',8'-trisulfonaphth-2'-yl)azo-3-ureidophenyl, 4-(4',8'-disulfonaphth-2'-yl)azo-3-acetylaminophenyl, 7-(1',5'-disulfonaphth-2'-yl)azo-6-sulfo-8-hydroxynaphth-3-yl and 4-(4'-sulfophenyl)azo-6-sulfonaphth-1-yl, 4-[4'-(β-sulfatoethylsulfonyl)-phenyl]azo-2-methyl-5-methoxyphenyl, 4-[3'-(β'-sulfatoethylsulfonyl)-phenyl]azo-3-methylphenyl, 4-[4'-(β-sulfatoethylsulfonyl)phenyl]azo-3-ureidophenyl, 4-[6'-(β-sulfatoethylsulfonyl)-naphth-2'-yl]azo-3-ureido-phenyl, 7-[2'-methoxy-5'-(β-sulfato-ethylsulfonyl)phenyl]azo-8-hydroxy-6-sulfonaphth-3-yl, 4-(2',5'-disulfo-phenyl)azo-6- or -7-sulfonaphth-1-yl, 4-(2', 4'-disulfophenyl)azo-6- or -7-sulfo-naphth-1-yl, 4-(4', 8'-disulfo-naphth-2'-yl)azo-6- or -7-sulfonaphth-1-yl, 4-(3', 6',8'-trisulfonaphth-2'-yl)azo-6- or -7-sulfonaphth-1-yl and 4-(4',6',8'-trisulfonaphth-2'-yl)-azo-6- or -7-sulfonaphth-1-yl.

Aromatic radicals Z—$D^2$- of compounds, used as diazo components, of the formulae Z—$D^2$—$NH_2$ or of the diaminobenzene and diaminonaphthalene compounds thereof, of the formulae $H_2N$—$D^2$—$NH_2$, are preferably radicals of the formulae (6a) and (6b)

(6a)

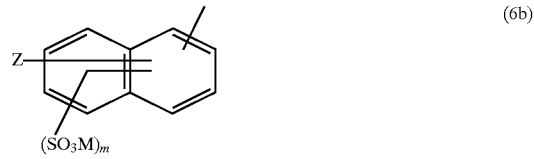

(6b)

in which Z, M, m, $P^1$ and $P^2$ have the definitions indicated above, especially the preferred definitions, it being possible for the respective benzene ring ortho to the free bond leading to the azo group to contain a hydroxy group in addition.

Aromatic radicals E of a couplable and diazotizable compound of the formula H—E—$NH_2$ are, for example, those of the formulae (7a), (7b) and (7c)

(7a)

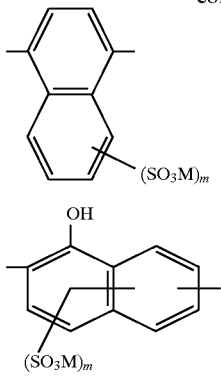

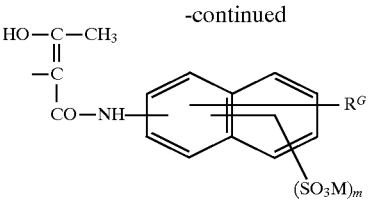

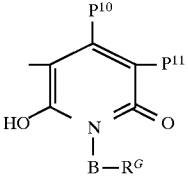

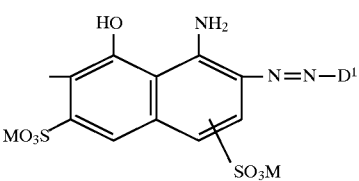

in which

P$^1$, M and m have the definitions indicated above and

P$^3$ is hydrogen, alkyl of 1 to 4 C atoms, such as methyl or ethyl, alkoxy of 1 to 4 C atoms, such as methoxy and ethoxy, chlorine, alkanoylamino of 2 to 5 C atoms, such as acetylamino and propionylamino, benzoylamino, ureido, phenylureido, alkylureido having 1 to 4 C atoms in the alkyl radical, phenylsulfonyl or alkylsulfonyl of 1 to 4 C atoms.

Radicals K$^1$ of coupling components of formula H—K$^1$ which carry no fiber-reactive group of the formula (2) are, for example, those of the formulae (8a) to (8h)

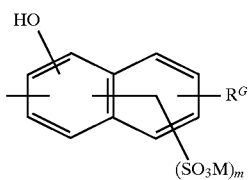

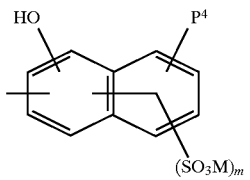

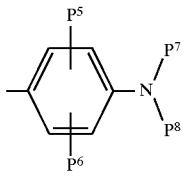

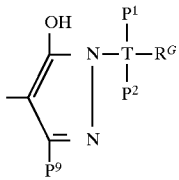

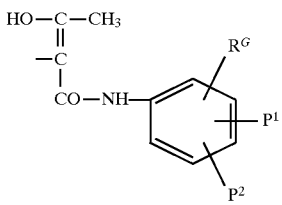

in which

R$^G$, P$^1$, P$^2$, m and M have the abovementioned meanings,

P$^4$ is alkanoylamino of 2 to 5 C atoms, such as propionylamino and especially acetylamino, or is phenylureido which can be substituted in the phenyl radical by substituents from the group consisting of chlorine, methyl, methoxy, sulfo and carboxy and/or by a group —SO$_2$—Y where Y has one of the above definitions, or P$^4$ is benzoylamino which can be substituted in the phenyl radical by substituents from the group consisting of chlorine, methyl, methoxy, nitro, sulfo and carboxy and/or by a group —SO$_2$—Y where Y has one of the above definitions, P$^5$ is hydrogen, alkyl of 1 to 4 C atoms, such as methyl and ethyl, alkoxy of 1 to 4 C atoms, such as methoxy and ethoxy, bromine, chlorine or sulfo, P$^6$ is hydrogen, alkyl of 1 to 4 C atoms, such as methyl and ethyl, alkoxy of 1 to 4 C atoms, such as methoxy and ethoxy, chlorine, alkanoylamino of 2 to 7 C atoms, such as acetylamino and propionylamino, ureido or phenylureido, P$^7$ is hydrogen or alkyl of 1 to 4 C atoms which can be substituted by hydroxy, cyano, carboxy, sulfo, sulfato, methoxycarbonyl, ethoxycarbonyl or acetoxy, P$^8$ is alkyl of 1 to 4 C atoms which can be substituted by hydroxy, cyano, carboxy, sulfo, sulfato, methoxycarbonyl, ethoxycarbonyl or acetoxy, or is benzyl or phenyl, or phenyl which is substituted by alkyl of 1 to 4 C atoms, alkoxy of 1 to 4 C atoms, chlorine and/or sulfo, P$^9$ is hydrogen, alkyl of 1 to 4 C atoms, such as methyl, cyano, carboxy, carboalkoxy of 2 to 5 C atoms, such as carbomethoxy and carboethoxy, carbamoyl or phenyl, preferably methyl, carboxy, methoxycarbonyl, ethoxycarbonyl or phenyl and especially methyl or carboxy, T is a benzene or naphthalene ring, preferably benzene ring, P$^{10}$ is hydrogen or alkyl of 1 to 4 C atoms, such as methyl, or is phenyl or alkyl of 1 to 4 C atoms which is substituted by alkoxy of 1 to 4 C atoms, such as methoxy, or by cyano, and is preferably alkyl of 1 to 4 C atoms or phenyl, P$^{11}$ is hydrogen, chlorine, bromine, sulfo, carbamoyl, methylsulfonyl, phenylsulfonyl, cyano or sulfoalkyl of 1 to 4 C atoms, preferably hydrogen, sulfo, sulfoalkyl having an alkyl radical of 1 to 4 C atoms, such as sulfomethyl, cyano or carbamoyl, B is alkylene of 1 to 4 C atoms, methylenephenylene, ethylenephenylene, phenylenemethylene, phenyleneethylene or phenylene or is phenylene, ethylenephenylene or methylenephenylene which is substituted in the benzene radical by fluorine, chlorine, bromine, methyl, methoxy, cyano, sulfo, carboxy, acetyl, nitro, carbamoyl and/or sulfamoyl, and $D^1$ is a radical of the formula (4a) or (4b).

Radicals —$K^2$—Z of coupling components of the formula H—$K^2$—Z and H—$K^2$—N($R^4$)H, in which the fiber-reactive radical must be introduced subsequently in accordance with the group $Z^1$ indicated later on, are, for example, radicals of the formulae (9a) to (9h)

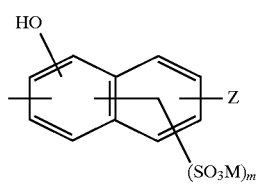 (9a)

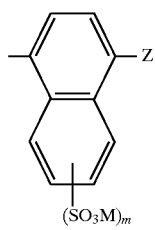 (9b)

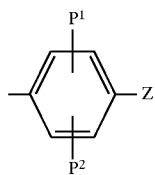 (9c)

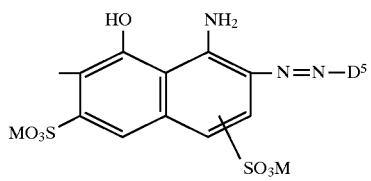 (9d)

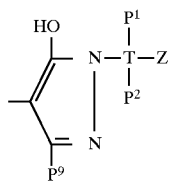 (9e)

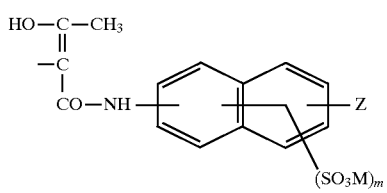 (9f)

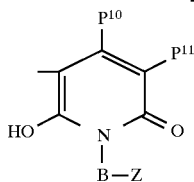 (9g)

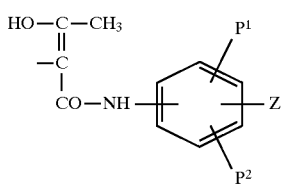 (9h)

in which $P^1$, $P^2$, $P^9$, $P^{10}$, $P^{11}$, B, T, M, m and Z have the definitions indicated above, especially the preferred definitions, and $D^5$ as the radical of a diazo component is a radical of the abovementioned and defined formula (6a) or (6b).

In the above formulae (8a), (8b) and (9a) the free bond leading to the azo group is attached to the aromatic nucleus ortho to the hydroxy group.

Radicals $K^3$ in the formulae (3g) and (3h) with a metal complex-binding oxygen atom are, in particular, those of the formulae (10a) to (10e)

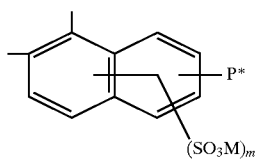 (10a)

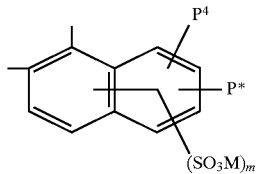 (10b)

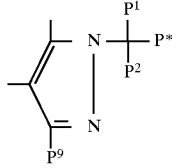 (10c)

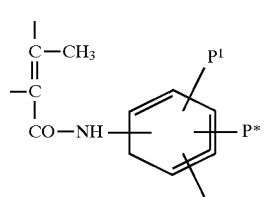 (10d)

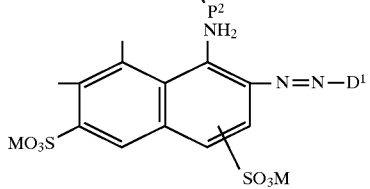 (10e)

in which the individual formula members have one of the abovementioned meanings and P* is hydrogen or a radical Z or a group of the formula —N=N—K²—Z or —N=N—K—H where K², Z and K have the abovementioned meanings.
Of the azo dyes preference is given, furthermore, to those of the formulae (12A) to (12S)
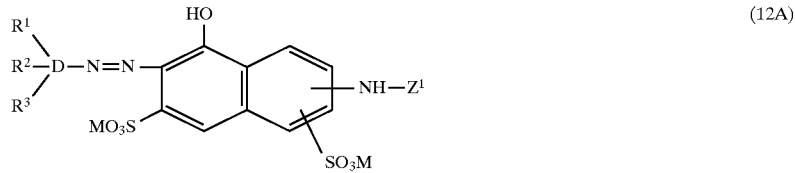 (12A)
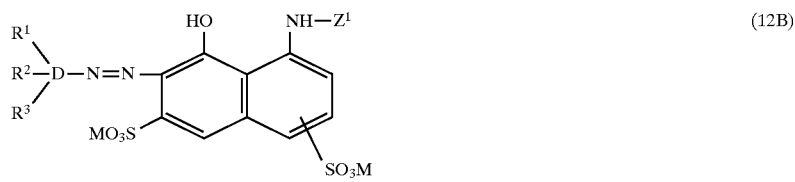 (12B)
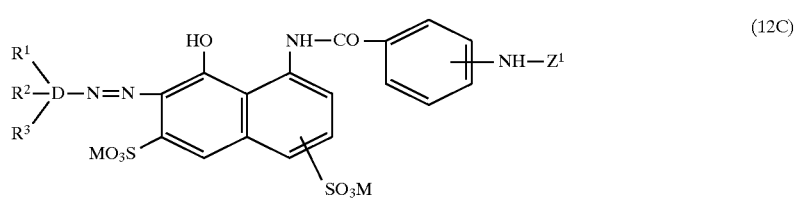 (12C)
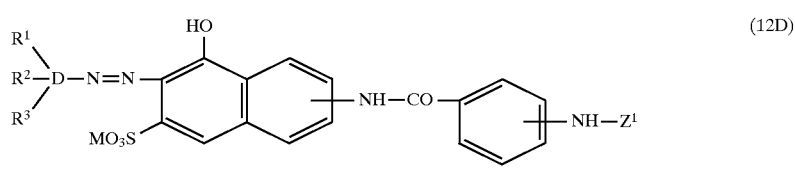 (12D)
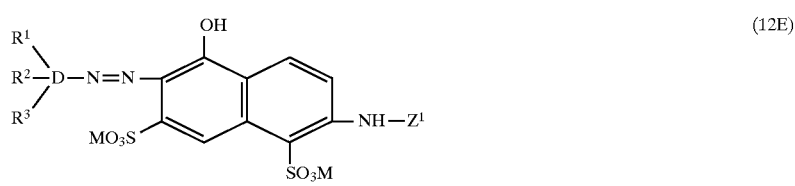 (12E)
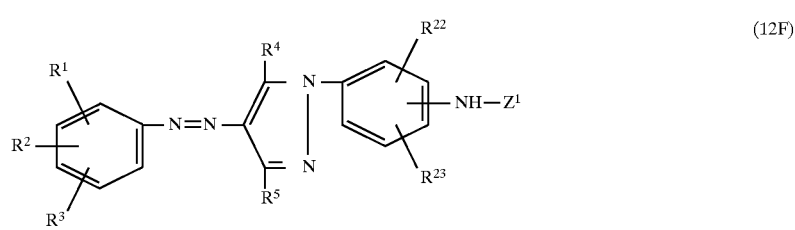 (12F)
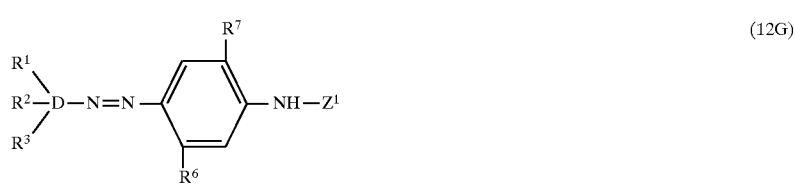 (12G)
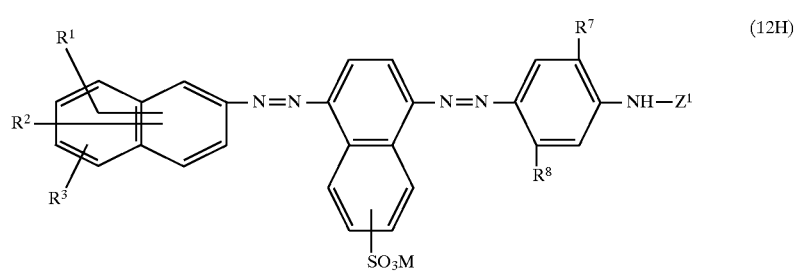 (12H)

-continued
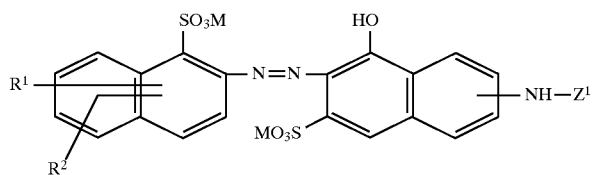 (12-Ia)
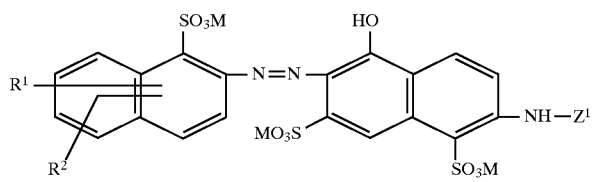 (12-Ib)
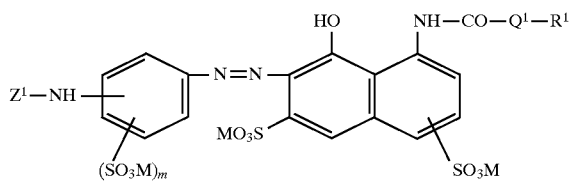 (12J)
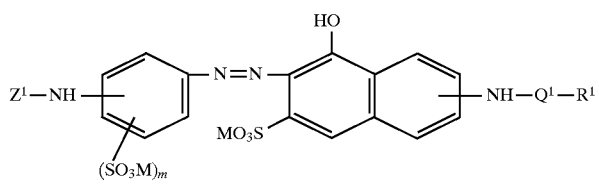 (12K)
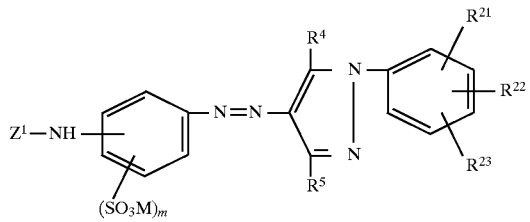 (12L)
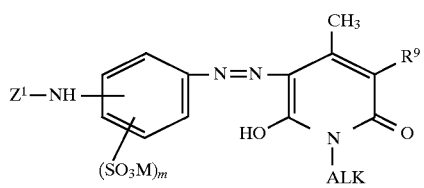 (12M)
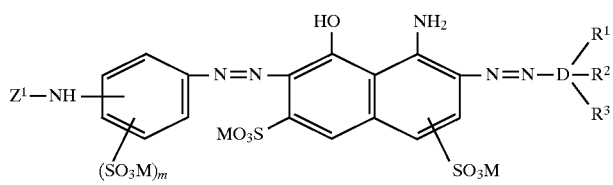 (12N)
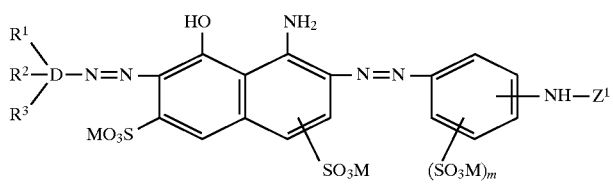 (12P)

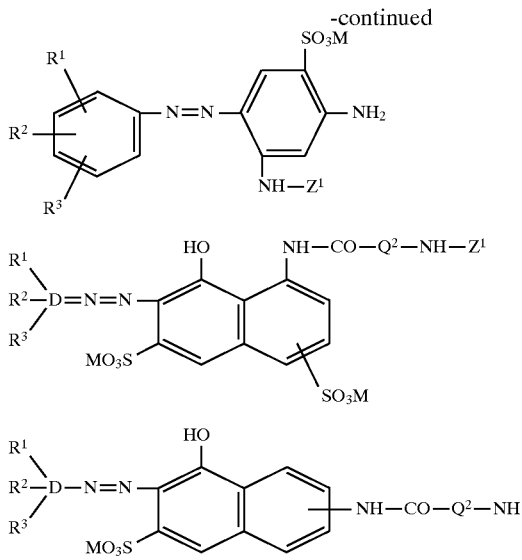

(12Q)

(12R)

(12S)

in which $Z^1$ is a radical of the formula (2A)

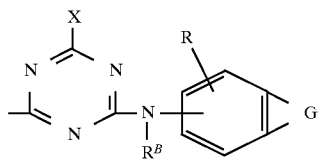

(2A)

in which X, R, $R^B$ and G have the abovementioned meanings, especially the preferred meanings;

M has one of the abovementioned meanings;

D is a benzene ring or is a naphthalene ring where the azo group is attached to the naphthalene ring preferably in the β-position and where, if D is the naphthalene ring, $R^2$ and $R^3$ are preferably each independently of one another a hydrogen atom or a sulfo group;

$R^1$ is hydrogen or sulfo or a group Y—SO$_2$—W°— with the abovementioned meaning;

$R^2$ is hydrogen, alkyl of 1 to 4 C atoms, such as ethyl and especially methyl, alkoxy of 1 to 4 C atoms, such as ethoxy and especially methoxy, halogen, such as chlorine and bromine, carboxy or sulfo and is preferably hydrogen, methyl, methoxy, bromine, chlorine, sulfo or carboxy and, with particular preference, hydrogen, methoxy or sulfo;

$R^3$ is hydrogen, alkyl of 1 to 4 C atoms, such as ethyl and especially methyl, alkoxy of 1 to 4 C atoms, such as ethoxy and especially methoxy, halogen such as chlorine and bromine, nitro, carboxy or sulfo, preferably hydrogen, methyl, methoxy, chlorine, carboxy, sulfo or acetylamino and, with particular preference, hydrogen, methoxy or sulfo;

$R^4$ is hydroxy or amino, preferably hydroxy;

$R^5$ is methyl, carboxy, carbomethoxy or carboethoxy, preferably methyl or carboxy;

$R^6$ is acetylamino, propionylamino, ureido or methyl;

$R^7$ is hydrogen, alkyl of 1 to 4 C atoms, such as methyl and ethyl, alkoxy of 1 to 4 C atoms, such as methoxy and ethoxy, halogen, such as bromine and especially chlorine, preferably hydrogen, methyl, ethyl, methoxy or ethoxy;

$R^8$ is hydrogen or alkyl of 1 to 4 C atoms, such as methyl and ethyl, alkanoylamino of 2 to 5 C atoms, such as acetylamino and propionylamino, or ureido, preferably hydrogen, methyl, ethyl, methoxy, ethoxy, acetylamino or ureido;

$R^9$ is hydrogen, cyano, carbamoyl, sulfamoyl or sulfomethyl, preferably hydrogen or carbamoyl;

$R^{21}$ has one of the meanings of $R^1$;

$R^{22}$ has one of the meanings of $R^2$;

$R^{23}$ has one of the meanings of $R^3$;

ALK is alkyl of 1 to 4 C atoms, such as methyl and ethyl, or alkyl of 2 to 4 C atoms, such as ethyl and propyl, which can be substituted by hydroxy, carboxy, sulfo or sulfato;

$Q^1$ is alkylene of 1 to 4 C atoms, such as ethylene and propylene or is phenylene, or phenylene substituted by sulfo, carboxy and/or alkyl of 1 to 4 C atoms, such as methyl;

$Q^2$ is a group of the formula —NH-alk- , —NH-phen- or -alk- , in which alk is alkylene of 2 to 4 C atoms and phen is sulfophenylene or phenylene;

m is the number zero, 1 or 2 (and if m is zero this group is hydrogen);

in the compounds of the formulae (12A), (12-la), (12K) and (12S) the amino or amido group is attached to the 8-naphthol radical in position 2 or 3 and in the compounds of the formulae (12B), (12C), (12J) and (12R) one group —SO$_3$M is attached to the amino or acylamino group in the meta or para position.

Radicals of the formula (13)

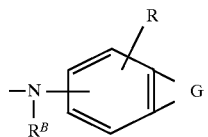

(13)

are, for example, benzimidazolin-2-one-4-ylamino, benzimidazolin-2-one-5-ylamino, 1-N-(4'-sulfophenyl) benzimidazolin-2-one-5-ylamino, 1-N-(3'-sulfophenyl) benzimidazolin-2-one-5-ylamino, 1-N-(6',8'-disulfonaphth-2'-yl)benzimidazolin-2-one-5-ylamino, quinoxaline-2,3-dione-6-ylamino, 7-methylquinoxaline-2,3-dione-6-ylamino, 7-methoxyquinoxalin-2,3-dione-6-ylamino, 7-ethoxyquinoxaline-2,3-dione-6-ylamino, 4-N-(4'-sulfophenyl)-quinoxaline-2,3-dione-6-ylamino, 4-N-(3'-sulfophenyl)quinoxaline-2,3-dione-6-ylamino, 4-N-(2',5'-disulfophenyl)quinoxaline-2,3-dione-6-ylamino, 4-N-(6',8'-disulfonaphth-2'-yl)quinoxaline-2,3-dione-6-ylamino, 4-N-(4',6',8'-trisulfonaphth-2'-yl)quinoxaline-2,3-dione-6-ylamino, oxazolin-2-one-4-ylamino, 6-chlorooxazolin-2-one-5-yl-amino, quinazoline-2,4-dione-6-ylamino, quinazoline-2,4-dione-7-ylamino, 3,4-dihydroquinolin-2-one-7-ylamino, 1,3-dihydroindol-2-one-6-ylamino, 1,2-benzisothiazolin-3-one 1,1-dioxide-5-ylamino, 1,2-benzisothiazolin-3-one-1,1-dioxide-6-ylamino, phthalimid-5-ylamino, N'-(4'-sulfophenyl)-phthalimid-5-ylamino, N'-(3'-sulfophenyl)phthalimid-5-ylamino, N'-(5',7'-disulfonaphth-2'-yl)phthalimid-5-ylamino, N'-(6',8'-disulfonaphth-2'-yl)-phthalimid-5-ylamino, benzimidazolin-2-one-4-yl(N-methyl)amino, quinolin-2-one-7-ylamino, 4-methylquinolin-2-one-7-ylamino, 4-ethylquinolin-2-one-7-ylamino, 4-phenylquinolin-2-one-7-ylamino, benzimidazolin-2-one-4-yl(N-β-sulfoethyl)amino, quinolin-2-one-7-yl(N-methyl)amino and 3,4-dihydroquinolin-2-one-7-yl(N-ethyl)amino.

Heavy metal complex azo dyes of particular importance are, for example, the 1:2 chromium complex and 1:2 cobalt complex and, in particular, the 1:1 copper complex monoazo compounds of the azo compounds of the formulae (12T) and (12U) below:

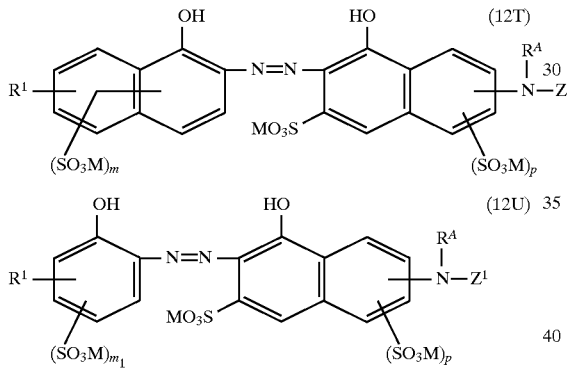

in which
M, m, $Z^1$, $R^A$ and $R^1$ have the abovementioned meanings, especially the preferred meanings,
p is the number zero or 1 (and if p is zero this group is hydrogen), and
$m_1$ is the number zero or 1 (and if m is zero this group is hydrogen).

Of the novel phthalocyanine dyes, preference is given to those of the formula (12 V)

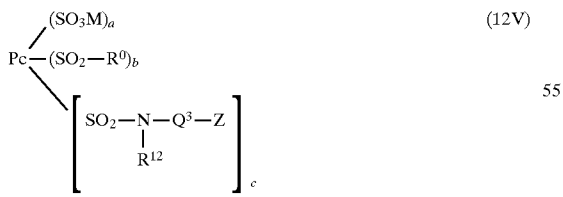

in which:
Pc is the radical of a nickel or, preferably, copper phthalocyanine;
$R^\circ$ is an amino group of the formula $-NR^{13}R^{14}$ in which $R^{13}$ and $R^{14}$ independently of one another are hydrogen or alkyl of 1 to 4 C atoms which can be substituted by hydroxy or sulfo, or is a heterocyclic, N-containing radical, such as the morpholino or piperidino radical;

$R^{12}$ is a hydrogen or alkyl of 1 to 4 C atoms, such as methyl and ethyl;
$Q^3$ is phenylene which can be substituted by 1 or 2 substituents from the group consisting of alkyl of 1 to 4 C atoms, such as ethyl and methyl, halogen, such as chlorine and bromine, carboxy and sulfo, for example sulfophenylene, or is alkylene of 2 to 6 C atoms, such as ethylene;
Z is the fiber-reactive group of the formula (2);
a is a number from zero to 3,
b is a number from zero to 3, and
c is a number from 1 to 2,
the sum of (a+b+c) being a number from 2 to 4.

Of these dyes, particular mention should be made of those of the formulae (12 Va) and (12 Vb)

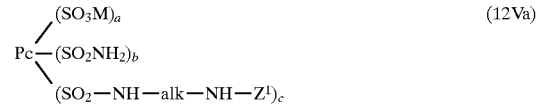

in which a is a number from 1 to 3, b is a number from 0 to 2 and c is a number from 1 to 2, the sum of (a+b+c) being a number from 2 to 4, Pc is the radical of a nickel or, preferably, copper phthalocyanine and alk is alkylene of 2 to 4 C atoms, preferably ethylene.

Novel copper formazan dyes are, in particular, those of the formula (12 W)

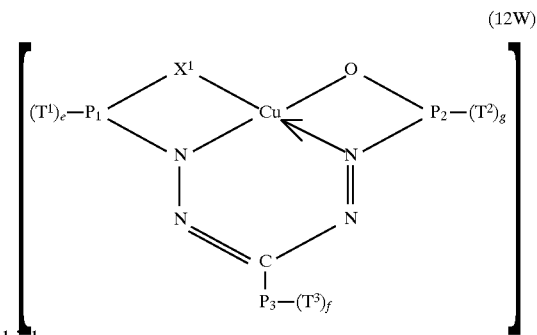

in which:
$X^1$ is an oxygen atom or, preferably, the carbonyloxy group, of the formula $-COO-$;
$P_1$ and $P_2$ are, independently of one another, each a benzene or naphthalene ring, the nitrogen atom and the group $X^1$ being attached ortho to one another to $P_1$ and the oxygen atom and the nitrogen atom being attached ortho to one another to $P_2$, and it also being possible for the benzene rings or naphthalene rings to be substituted by one or two substituents from the group consisting of halogen, such as chlorine, nitro, alkyl of 1 to 4 C atoms, such as methyl and ethyl, alkoxy of 1 to 4 C atoms, such as methoxy and ethoxy, sulfamoyl, mono- or di-($C_1$–$C_4$-alkyl)-substituted sulfamoyl, alkylsulfonyl of 1 to 4 C atoms, such as methylsulfonyl and ethylsulfonyl, and phenylsulfonyl, both $P_1$ and $P_2$ preferably being a benzene ring;

$P_3$ is a straight-chain or branched alkylene group of 2 to 6 C atoms, preferably of 2 to 4 C atoms, which can be substituted by a sulfophenyl group, or is a phenylene group or a naphthylene group which can be substituted by 1 or 2 substituents from the group consisting of methyl, ethyl, methoxy, ethoxy and chlorine, $P_3$ preferably being a benzene ring;

$T^1$, $T^2$ and $T^3$ are, independently of one another, each a sulfo or carboxy group, preferably a sulfo group;

e, f and g are, independently of one another, each the number zero 1 or 2, the sum of (e+f+g) being an integer from 1 to 4 and preferably 2 or 3, especially 2, and if e or f or g is zero the group $T^1$ or $T^2$ or $T^3$, respectively, is a hydrogen atom;

p is the number 1 or 2, preferably 1, where the group —NH—$Z^1$ can be attached to an aromatic radical of $P_1$, $P_2$ or $P_3$ and is preferably attached to $P_2$.

Of the copper formazan dyes of the formula (12W) preference is given to those in which $P_1$ and $P_2$ are both a benzene ring, the group —NH—$Z^1$ is attached to $P_2$ and $T^1$ and $T^2$ each are sulfo groups, e and g both being the number 1. Where the group —NH—$Z^1$ is attached to $P_1$, e is the number zero, g is the number 2 and $T^2$ is a sulfo group. Furthermore, the group —$P_3$—$(T^3)_f$ is preferably the phenyl radical or a 2- or 4-sulfophenyl radical.

Of these copper formazan dyes, particular attention is drawn to those of the formula (12 Wa)

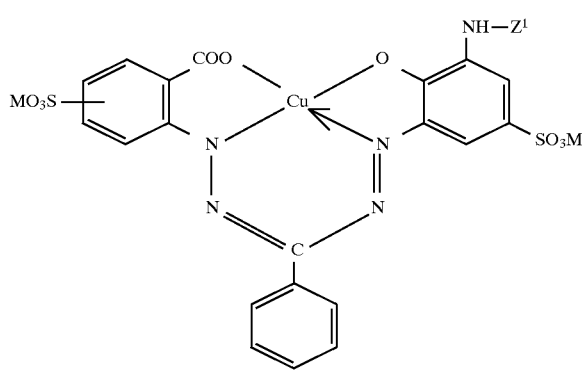

(12 Wa)

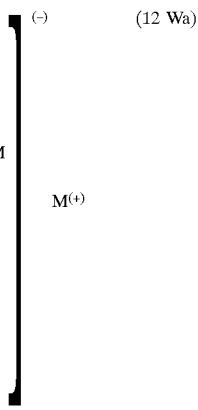

in which M and $Z^1$ have the abovementioned meanings, especially the preferred meanings.

Of the novel triphendioxazine dyes, attention is drawn to those of the formula (12 X)

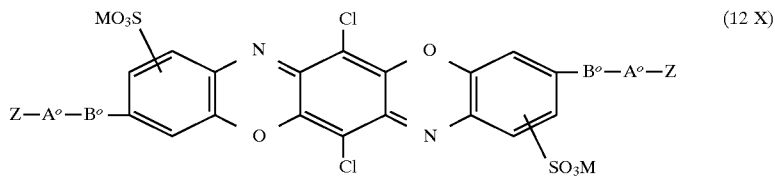

(12 X)

in which M and Z have one of the abovementioned meanings, B° is the oxy group —O— or the amino group —NH— and A° is alkylene of 2 to 6 C atoms which can be interrupted by 1 or 2 hetero-groups, such as groups of the formulae —O—, —NH—, —NH—CO— and/or —CO—NH—, and/or can be substituted e.g. by hydroxy, sulfo, sulfato or carboxy, or is cyclohexylene, or in which the group Z—A°—O—B°— or —B°—A°—Z together is the radical $Z^1$—NH— or —NH—$Z^1$ as defined above, and in which the two sulfo groups —SO$_3$M are preferably attached to the benzene ring ortho to the oxygen atom of the heterocyclic ring.

Of the novel anthraquinone dyes, particular mention is made of those of the formula (12 Y)

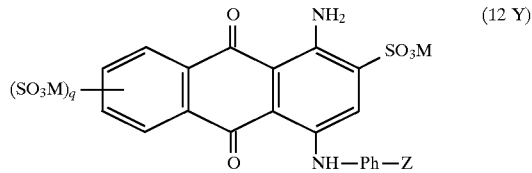

(12 Y)

in which

M, Z and q have one of the abovementioned meanings and

Ph is phenylene which can be substituted by one or two substituents from the group consisting of alkyl of 1 to 4 C atoms, such as methyl and ethyl, alkoxy of 1 to 4 C atoms, such as methoxy and ethoxy, halogen, such as chlorine and bromine, carboxy and sulfo, or is phenylene which is substituted by 3 or 4 methyl groups.

Also of importance are asymmetric dioxazine dyes of the formula (12 Z)

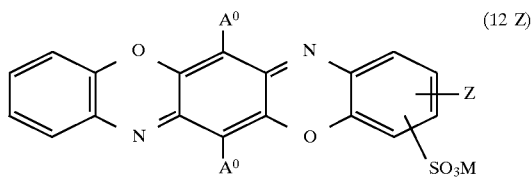

(12 Z)

in which M and Z have the abovementioned meanings and A° is at each occurrence halogen, such as chlorine, or alkyl of 1 to 4 C atoms, such as methyl.

The present invention also relates to processes for preparing the novel dyes of the formula (1). They can be prepared in a manner conventional per se in analogy to known synthesis routes specific for the particular class of dye, by reacting precursors typical of their respective dye, at least one of which precursors contains a group of the formula (2), with one another, or by reacting a halotriazine compound of the formula (21)

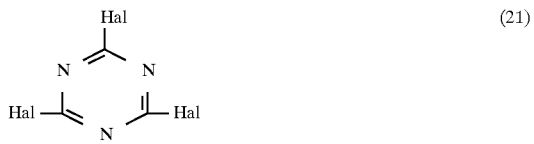

in which Hal is Halogen, such as chlorine or fluorine, for example 2,4,6-trifluoro-,3,5-triazine (cyanuric fluoride) or 2,4,6-trichloro-1,3,5-triazine (cyanuric chloride) in whatever sequence with an amino-containing compound of the formula (20)

where F, $R^A$ and n have the abovementioned meanings, in an equimolar amount, and with an amino compound of the formula (22)

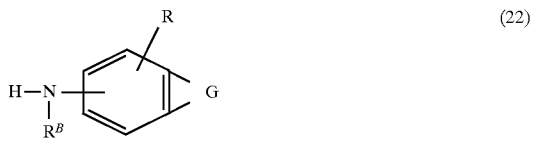

where $R^B$, R and G have the abovementioned meanings, in an equimolar amount.

Novel process variants of this novel procedure comprise, for example, reacting a compound of the formula (23)

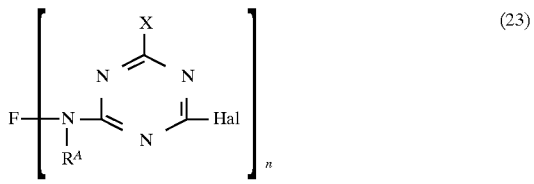

in which F, $R^A$, X, Hal and n have the abovementioned meanings with an amino compound of the formula (22) in an equimolar amount, or reacting a compound of the formula (24)

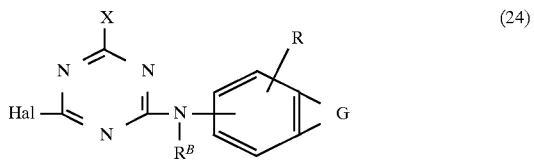

in which Hal, X, $R^B$, R and G have the abovementioned meanings with a compound of the formula (20) with the abovementioned meaning. Of these variants, preference is given to the procedure of reacting a compound of the formula (23) with a compound of the formula (22).

In the course of the condensation reactions, care should be taken to ensure that the fiber-reactive groups are not damaged in the alkaline range.

The reactions of the starting compounds take place in an aqueous or aqueous-organic medium in suspension or solution. If the reactions are carried out in an aqueous-organic medium, then the organic medium is, for example, acetone, dimethylformamide, dimethyl sulfoxide or N-methylpyrrolidone. Advantageously, the hydrogen halide released in the course of the condensation is neutralized continually by addition of aqueous alkali metal or alkaline earth metal hydroxides, carbonates or bicarbonates. The first condensation reaction of the halo-s-triazine of the formula (21) takes place in general at a temperature of between −5° C. and +20° C., in the case where Hal is fluorine preferably at a temperature of between −5° C. and +5° C., and at a pH of between 2 and 10, preferably between 4 and 6. The subsequent condensation reaction with the second amino compound takes place in general at a temperature of between 0° and 60° C., where Hal is fluorine preferably at a temperature of between 0° and 20° C., and at a pH of between 3 and 10, preferably between 6 and 10.

The reaction between a compound of the formula (23) and a compound of the formula (22) takes place in particular at a temperature of between 0° and 50° C., preferably between 10° and 30° C., and at a pH of between 3 and 10, preferably between 6 and 8, the reaction preferably being conducted at a temperature of between 0° and 20° C. when Hal in the compound of the formula (23) is a fluorine atom.

The reaction of a compound of the formula (24) with a compound of the formula (20) likewise takes place at a temperature of between 0° and 40° and at a pH of between 3 and 10, the reaction preferably being conducted at a temperature of between 0° and 20° C. and at a pH of between 7 and 10 when a compound of the formula (24) is used where Hal is fluorine.

Starting from the compounds (20), the starting compounds of the formula (23) can be prepared in an entirely conventional procedure of the reaction of halogen-substituted triazines with amino-containing compounds, as described, for example, above for the novel procedures, i.e. likewise in aqueous or aqueous-organic medium in general at a temperature of between −5° C. and +40° C. preferably between 0° and 30° C., and at a pH of between 2 and 10, preferably between 5 and 7, the reaction temperature chosen being between −5° C. and +5° C. in the case of a starting compound of the formula (21) where Hal is fluorine. In the same way and under the same process conditions, the starting compounds of the formula (24) can be prepared by reacting a compound of the formula (21) with a compound of the formula (22).

Provided X is chlorine, the triphendioxazine compounds of the formula (12 X) can preferably be prepared by reacting a compound of the formula (23A)

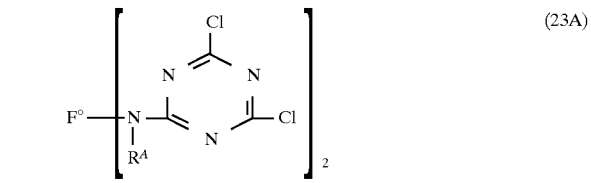

in which $R^A$ has the abovementioned meaning and F° is a radical of the formula (12 X-F)

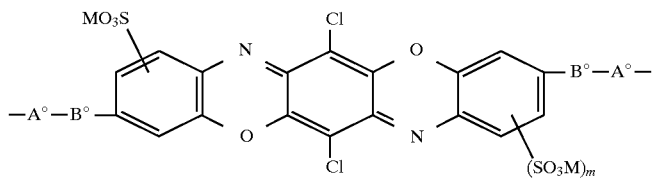

(12 X-F)

where M, A° and B° have the abovementioned meanings with an amino compound of the formula (22) as defined above in two times the molar amount at a temperature of between 40° and 60° C. and at a pH of between 3 and 10, preferably a pH of between 4 and 5. Starting from the triphendioxazine compounds of the formula (23) in which F is a radical of the formula (12 X-F), n is 2 and Hal is fluorine and $R^A$ has the abovementioned meaning, the reaction with the amine (22) takes place preferably at a temperature of between 0° and 20° C. and at a pH of between 6 and 10.

The starting compounds of the formula (21) and of the formula (20) and their precursors are generally known and have been described in numerous instances in the literature. Examples of compounds of the formula (21) are cyanuric chloride and cyanuric fluoride.

Examples of aromatic amines which are used as diazo components for synthesizing the novel azo dyes of the formula (1) and which are themselves of the formulae $D^1$—$NH_2$ are:
1-amino-2-, -3- or -4-methoxybenzene, 1-amino-2-, -3- or -4-chlorobenzene, 1-amino-2, 5-dichlorobenzene, 1-amino-2, 5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide or the corresponding -N-methyl, -N-ethyl, -N,N-dimethyl or -N,N-diethyl amides, dehydrothio-p-toluidinesulfonic acid, 1-amino-3-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4-or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid,1,4-diaminobenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-3,6- or -5,7-disulfonic acid, 1-aminonaphthalene-3,6- or -5,7-disulfonic acid, 2-aminonaphthalene-1-sulfonic acid, 2-aminonaphthalene-1,5-, 1,7-, -3,6-, -5,7-, -4,8- or -6,8-disulfonic acid, 1-aminonaphthalene -2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminoazobenzene-3,4'-disulfonic acid, 3-methoxy-4-amino-6-methyl-azobenzene-2',4'-disulfonic acid, 3-methoxy-4-amino-6-methylazobenzene-2',5'-disulfonic acid, 2-(β-sulfatoethylsulfonyl)aniline, 3-(β-sulfatoethylsulfonyl)aniline, 4-(β-sulfatoethylsulfonyl) aniline, 2-carboxy-5-(β-sulfatoethylsulfonyl)aniline, 2-chloro-3-(sulfatoethylsulfonyl)aniline, 2-chloro-4-(β-sulfatoethylsulfonyl)aniline, 2-bromo-4-(β-sulfatoethylsulfonyl)aniline, 4-methoxy-3-(β-sulfatoethylsulfonyl)aniline, 4-chloro-3-(β-sulfatoethylsulfonyl)aniline, 2-ethoxy-4- or -5-(β-sulfatoethylsulfonyl)aniline, 2-methyl-4-(β-sulfatoethylsulfonyl)aniline, 2-methoxy-5- or -4-(β-sulfatoethylsulfonyl)-aniline, 2,4-diethoxy-5-(β-sulfatoethylsulfonyl)aniline, 2,4-dimethoxy-5-(β-sulfatoethylsulfonyl)aniline, 2,5-dimethoxy-4-(β-sulfatoethylsulfonyl)-aniline, 2-methoxy-5-methyl-4-(β-sulfatoethylsulfonyl)aniline, 2- or 3- or 4-(β-thiosulfatoethylsulfonyl)aniline, 2-methoxy-5-(β-thiosulfatoethylsulfonyl)aniline, 2-sulfo-4-(β-phosphatoethylsulfonyl)aniline, 2-sulfo-4-vinylsulfonylaniline, 2-hydroxy-4- or -5-(β-sulfatoethylsulfonyl)aniline, 2-chloro-4- or -5-(β-chloroethylsulfonyl)aniline, 2-hydroxy-5-(β-sulfatoethylsulfonyl)aniline, 2-hydroxy-3-sulfo-5-(β-sulfatoethylsulfonyl)aniline, 3- or 4-(β-acetoxyethylsulfonyl)aniline, 6-carboxy-1-sulfo-2-aminonaphthalene, 5-(β-sulfatoethylsulfonyl)-2-aminonaphthalene, 6- or 7- or 8-(β-sulfatoethyl-sulfonyl)-2-aminonaphthalene, 6-(β-sulfatoethylsulfonyl)-1-sulfo-2-amino-naphthalene, 5-(β-sulfatoethylsulfonyl)-1-sulfo-2-aminonaphthalene, 8-(β-sulfatoethylsulfonyl)-6-sulfo-2-aminonaphthalene, 4-[N-methyl-N-(β-sulfatoethylsulfonyl)]aminoaniline, 3-[N-methyl-N-(β-sulfatoethylsulfonyl)]aminoaniline, 4-[β-(β'-sulfatoethylsulfonyl)ethyl]-aniline, 3- or 4-[β-(β'-chloroethylsulfonyl)ethylamino]aniline, 3- or 4-[β-(β'-sulfatoethylsulfonyl)ethylamino]aniline, 3- or 4-[γ-(β'-chloroethylsulfonyl)-propylamino]aniline, 3- or 4-[γ-(β'-sulfatoethylsulfonyl)propylamino]aniline and 3- or 4-[γ-(vinylsulfonyl)propylamino]aniline.

Examples of starting compounds of the formula $H_2N$—$D^2$—$NH_2$ are
1,4-phenylenediamine, 1,4-phenylenediamine-2-sulfonic acid, 1,4-phenylenediamine-2-carboxylic acid, 1,4-diaminonaphthalene-2-sulfonic acid, 2,6-diaminonaphthalene-8-sulfonic acid, 2,6-diaminonaphthalene-4,8-disulfonic acid, 1,3-phenylenediamine, 1,3-phenylenediamine-4-sulfonic acid, 1,3- phenylenediamine-4,6-disulfonic acid, 1,4-phenylenediamine-2,6-disulfonic acid, 1,4-phenylenediamine-2,5-disulfonic acid, 1,4-diaminonaphthalene-6-sulfonic acid, 4,4'-diaminodiphenyl-3-sulfonic acid and 4,4'-diaminostilbene-2,2'-disulfonic acid.

Examples of starting compounds which are used for preparing novel disazo dyes of the formula (1) first as coupling component and then, in the form of the resulting amino-azo compound, as diazo compound and are of the formula H—E—$NH_2$ are aniline, 3-methylaniline, 2-methoxy-5-methylaniline, 2,5-dimethylaniline, 3-ureidoaniline, 3-acetylaminoaniline, 3-propionylaminoaniline, 3-butyrylaminoaniline, 3-methoxyaniline, 2-methyl-5-acetylaminoaniline, 2-methoxy-5-acetylaminoaniline, 2-methoxy-5-methylaniline, 3-(hydroxyacetylamino)aniline, 1,3-diaminobenzene-4-sulfonic acid, 1-amino-naphthalene-6-, -7- or -8-sulfonic acid, 1-amino-2-methoxynaphthalene-6-sulfonic acid, 2-amino-5-hydroxynaphthalene-7-sulfonic acid, 2-amino-5-hydroxynaphthalene-1,7-disulfonic acid, 2-amino-8-hydroxynaphthalene-6-sulfonic acid, 2-(4'-aminobenzoylamino)-5-naphthol-7-sulfonic acid, 1-(4'-amino-2'-sulfophenyl)-3-methyl-5-pyrazolone, 1-(4'-amino-2'-sulfophenyl)-3-carboxy-5-pyrazolone and N-(acetoacetyl)-3-sulfo-4-aminoanilide.

Examples of starting compounds for preparing the novel azo compounds of the formula (1), which can be used as coupling components and are of the formula H—$K^1$ or H—$K^2$—N($R^A$)H or H—K—H, are:
phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- and 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxy-naphthalene-1,7-disulfonic acid, 2-amino-8-hydroxynaphthalene-6-sulfonic acid, 2-methyl- and 2-ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxy-naphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- and -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methylpyrazol-(5)-one, 1-phenyl-3-methyl-5-pyrazolone, 1-(4'-sulfophenyl)-3-methyl-5-pyrazolone, 1-(4'-sulfophenyl)pyrazol-(5)-one-3-carboxylic acid, 1-(3'-aminophenyl)-3-methyl-5-pyrazolone, 1-(2',5'-disulfo-phenyl)-3-methyl-5-pyrazolone, 1-(2'-methyl-4-sulfophenyl)-5-pyrazolone-3-carboxylic acid, 1-(4',8'-disulfonaphth-2'-yl)-3-methyl-5-pyrazolone, 1-(5',7'-disulfonaphth-2'-yl)-3-methyl-5-pyrazolone, 1-(2',5'-dichloro-4'-sulfophenyl)-3-methyl-5-pyrazolone, 3-aminocarbonyl-4-methyl-6-hydroxypyrid-2-one, 1-ethyl-3-cyano- or -3-chloro-4-methyl-6-hydroxypyrid-2-one, 1-ethyl- 3-cyano- or -3-chloro-4-methyl-6-hydroxypyrid-2-one, 1-ethyl-3-sulfomethyl-4-methyl-6-hydroxypyrid-2-one, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxypyrid-2-one, 1-ethyl-3-sulfomethyl-4-methyl-5-carbamoyl-6-hydroxypyrid-2-one, N-acetoacetylaminobenzene, 1-(N-acetoacetylamino)-2-methoxybenzene-5-sulfonic acid, 4-hydroxyquinol-2-one, 1-amino-8-hydroxy-7-(phenylazo)-naphthalene-3,6-disulfonic acid, 1-amino-8-hydroxy-7-(4'-sulfophenylazo)-naphthalene-3,6-disulfonic acid, 1-amino-8-hydroxy-7-(2',5'-disulfophenylazo)naphthalene-3,6-disulfonic acid, 1-[4'-(β-sulfatoethylsulfonyl)phenyl]-3-methyl-5-pyrazolone, 1-[4'-(vinyl-sulfonyl)phenyl]-3-methyl-5-pyrazolone, 1-[4'-(β-sulfatoethylsulfonyl)phenyl]-3-carboxy-5-pyrazolone, 1-[3'-[β-chloroethylsulfonyl)benzoylamino]-3,6-disulfo-8-naphthol, 1-[3'-(vinylsulfonyl)benzoylamino]-3,6-disulfo-8-naphthol, 1-[3'-(vinylsulfonyl)benzoylamino]-4,6-disulfo-8-naphthol, 1-[3'-(β-sulfatoethylsulfonyl)benzoylamino]-4,6-disulfo-8-naphthol, 2-[3'-(β-chloroethylsulfonyl)benzoylamino]-6-sulfo-8-naphthol, 2-[3'-(vinylsulfonyl)benzoylamino]-6-sulfo-8-naphthol, 3-[3'-(β-chloroethylsulfonyl)benzoylamino]-6-sulfo-8-naphthol, 3-[3'-(vinylsulfonyl)benzoylamino]-6-sulfo-8-naphthol, 6-sulfo-1-[3'-(β-chloroethylsulfonyl)benzoylamino]naphthol, 7-sulfo-[3'-(vinylsulfonyl)benzoylamino]naphthol, 2-[N-methyl-N-(β-sulfatoethylsulfonyl)amino]-6-sulfo-8-naphthol, 3-[N-methyl-N-(β-sulfatoethylsulfonyl)amino]-6-sulfo-8-naphthol, 2-[N-ethyl-N-(β-sulfatoethylsulfonyl)amino]-6-sulfo-8-naphthol, 1-[N'-(3'β-chloroethylsulfonylphenyl)ureido]-3,6-disulfo-8-naphthol, 1-[N'-(3'-vinylsulfonylphenyl)ureido]-3,6-disulfo-8-naphthol, 1-[N'-(3'-vinylsulfonylpropyl)ureido]-3,6-disulfo-8-naphthol, 1-[N'-(3'-β-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-β-chloroethylsulfonylpropyl)ureido]-4,6-disulfo-8-naphthol, 2-[N'-(3'-β-sulfatoethylsulfonylphenyl)ureido]-6-sulfo-8-naphthol, 2-[N'-(3'-chloroethylsulfonylpropyl)ureido]- 6-sulfo-8-naphthol, 3-[N'-(3'-β-chloroethylsulfonylphenyl)ureido]-6-sulfo-8-naphthol, 3-[N'-(3'-vinylsulfonylpropyl)ureido]-6-sulfo-8-naphthol, 2-sulfo-5-[N'-(3"-β-chloroethylsulfonyl)phenyl]ureidoaniline, 3-[N'-(3"-β-sulfatoethylsulfonyl)phenyl]ureidoaniline and 6-sulfo-1-[N'-(3"-β-sulfatoethylsulfonyl)phenyl]ureido-8-naphthol.

Coupling components of the formula H—K—N($R^A$)H, which can be used to construct the novel azo dyes in which the fiber-reactive radical Z is present in the coupling component, where in the case of the initially obtained amino-containing azo dye of the formula (20) the fiber-reactive radical $Z^1$ is or can be subsequently introduced into its amino group —N($R^4$)H, are, for example, aniline, 3-methylaniline, 2,5-dimethylaniline, 2,5-dimethoxyaniline, 3-methoxyaniline, 3-acetylaminoaniline, 3-propionylaminoaniline, 3-butyrylaminoaniline, 3-benzoylaminoaniline, 3-(hydroxyacetylamino)aniline, 3-ureidoaniline, 2-methyl-5-acetylamino-aniline, 2-methoxy-5-acetylaminoaniline, 2-methoxy-5-methylaniline, 1-aminonaphthalene-6-sulfonic acid, 1-aminonaphthalene-7-sulfonic acid, 4-sulfo-1,3-diaminobenzene, 6-sulfo-2-methoxy-1-aminonaphthalene, 5,7-disulfo-2-aminonaphthalene, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 1-amino-8-naphthol-3,6-disulfonic acid, 1-amino-8-hydroxy-4,6-disulfonic acid, 1-amino-8-hydroxy-naphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)- and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo) naphthalene-3,6-disulfonic acid, 1-amino-8-hydroxy-2-(4'-sulfophenylazo)naphthalene-3,6-disulfonic acid, 1 -amino-8-hydroxy-2-( 2',5'-disulfophenylazo)naphthalene-3,6-disulfonic acid, 1-(β-aminoethyl)-3-cyano-4-methyl-6-hydroxypyrid-2-one, 1-(γ-aminopropyl)-3-sulfomethyl-4-methyl-6-hydroxypyrid-2-one, 1,3-diaminobenzene, 3-[N,N-di-(β-hydroxyethyl)]aminoaniline, 3-[N,N-di-(β-sulfatoethyl)]amino-4-methoxyaniline, 3-(sulfobenzylamino)aniline, 3-(sulfobenzoylamino)-4-chloroaniline and 3-[N,N-di-(sulfobenzyl)]amino-aniline, 2-sulfo-5-acetylaminoaniline, 2-amino-5-naphthol-7-sulfonic acid, 2-amino-8-naphthol-6-sulfonic acid, 1-(4'-aminobenzoyl)amino-8-hydroxynaphthalene-3,6-disulfonic acid, 1-(4'-aminobenzoyl)amino-8-hydroxynaphthalene-4,6-disulfonic acid, 1-(3'-aminobenzyl)amino-8-hydroxynaphthalene-3,6-disulfonic acid, 1-(3'-aminobenzoyl)amino-8-hydroxynaphthalene-4,6-disulfonic acid, 1-(2'-aminobenzoyl)amino-8-hydroxynaphthalene-3,6-disulfonic acid, 1-(2'-aminobenzoyl)amino-8-hydroxynaphthalene-4,6-disulfonic acid, 2-(3'-aminobenzoyl)amino-5-hydroxynaphthalene-7-sulfonic acid, 2-(2'-aminobenzoyl)amino-5-hydroxynaphthalene-7-sulfonic acid, 2-(4'-amino-benzoyl)amino-8-hydroxynaphthalene-6-sulfonic acid, 2-(3'-aminobenzoyl)amino-8-hydroxynaphthalene-6-sulfonic acid, 2-(2'-aminobenzoyl)amino-8-hydroxynaphthalene-6-sulfonic acid, 2-(4'-aminobenzoyl)amino-5-naphthol-7-sulfonic acid, 1-(4'-amino- or 1-(4'-acetylamino-2-sulfophenyl)-3-methyl- or -3-carboxy-5-pyrazolone, 3-sulfo-4-amino-acetoacetylanilide, 1-amino-8-naphthol-3,6- or -4,6-disulfonic acid, 1-(3'-aminobenzoylamino)- or 1-(4'-aminobenzoylamino)-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methylamino)-8-naphthol-6-sulfonic acid, 1-(3'-amino- or 1-(3'-acetylamino-6'-sulfophenyl)-3-methyl- or -3-carboxy-5-pyrazolone, 2-(N-methyl-N-acetylamino)- or 2-methylamino-5-naphthol-7-sulfonic acid, N-methylaniline and N-propyl-m-toluidine.

If starting from diazo components of the formula $H_2N$—$D^2$—$NH_2$, they can also be employed in the form of the monoacylamino-amino compounds, the acyl radical being, in particular, the acetyl radical. These monoacylamino-amino compounds are first diazotized and coupled with a couplable compound; next, the acyl radical is eliminated hydrolytically, and the then reliberated amino group can be attached to the fiber-reactive radical $Z^1$. Examples of such monoacylated diamines are 2-sulfo-5-acetylaminoaniline and 2-sulfo-4-acetylaminoaniline. Similarly, amino-containing coupling components can be employed in the coupling reaction in the form of the acylamino derivative, it being possible here too subsequently to eliminate the acyl radical by hydrolysis in order to attach the liberated amino group to the fiber-reactive group $Z^1$.

Bivalent coupling components, which can be used to construct novel disazo dyes, in which the bivalent coupling radical is attached to two diazo components of which one or both contain(s) a fiber-reactive radical Z, for example of dyes of the formula (3d), are, for example, resorcinol, 1,3-diaminobenzene, 5,5'-dihydroxy-7,7'-disulfo-2,2'-dinaphthylurea, 1,8-dihydroxy-3,6-disulfonaphthalene and, in particular, 1-amino-8-naphthol-3,6-disulfonic acid and 1-amino-8-naphthol-4,6-disulfonic acid.

In the novel synthesis of the azo dyes, if starting from diazo or coupling components which already include the group of the formula (2), the reactions take place in the customary procedure of diazotization and coupling reactions; that is, diazotization generally at a temperature of between –5° C. and +15° C. and at a pH of below 2 by means of a strong acid and alkali metal nitrite in preferably aqueous medium, and the coupling reaction in general at a pH of between 1.5 and 4.5 in the case of an amino-containing coupling component and at a pH of between 3 and 7.5 in the case of a hydroxy-containing coupling component, and at a temperature of between 0° and 25° C., likewise preferably in an aqueous medium.

In the case of the novel synthesis of heavy metal complex azo dyes, for example those of the formula (3g) and (3h), it is usual to start from those heavy metal-free azo compounds which contain a phenolic or naphtholic hydroxy group ortho or vicinal to the azo group in the coupling component and whose diazo component radical includes an attached hydrogen atom or an attached hydroxy group or an attached lower alkoxy group, such as a methoxy group, ortho to the azo group, it also being possible for the heavy metal-free starting azo compounds to include an attached acylamino radical, such as an acetylamino radical. For example, in the case of the synthesis of the copper complex azo dyes of the formula (3h) it is possible to start from a starting compound of the formula (25)

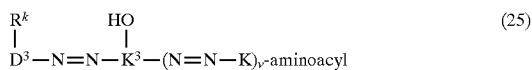
(25)

in which $D^3$, K, $K^3$ and v have one of the abovementioned meanings and $R^k$ is a hydrogen atom or is a hydroxy or methoxy group which is attached to $D^3$ ortho to the azo group and to react this acylamino-containing azo starting compound, in analogy to known and customary procedures, with a copper donor, such as a copper salt. If $R^k$ is a hydrogen atom or a methoxy group, then the compound (25) can be subjected to an oxidative or dealkylating copperizing reaction, which can be conducted by customary methods. The resulting copper complex azo compound with the acylamino group can then be reacted in analogy to known procedures, following or accompanied by the hydrolysis of the acylamino group to the amino group, with a compound of the formula (21) or (24) to give the novel dye of the formula (1).

The starting compounds of the formula (22) are known from the literature (see for example Dyes and Pigments 21 (1993), 123, and Ann. Chim. 49 (1959), 1809 and also European Patent Application Publication No. 0 629 667); insofar as individual compounds have not been described, they can be prepared in analogy to the procedure of the prior art. For example, compounds of the formula (22) in which G is a radical of the formula (a) or (e) where $R^{10}$ has one of the meanings indicated which is other than hydrogen can be prepared by starting from compounds of the formula (14) below where $R^{10}$ has the meaning given above (which are known, for example, from Fierz-David & Blangley, "Farbenchemie", 8th ed. (1952), Springer Verlag, Table 5 of the appendix) and reacting them with phosgene, dialkyl carbonate or alkyl chloroformates or with oxalyl chloride at a temperature of between 0° and 100° C. and at a pH of between 6 and 10 and then, in the resulting heterocyclic compound of the formula (15)

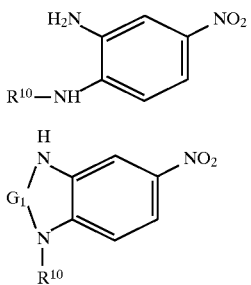

in which $R^{10}$ has the abovementioned meaning and $G_1$ is the group —CO— or —CO—CO—, reducing the nitro group in a known manner to the amino group, by means for example of hydrogen and a nickel, palladium or platinum catalyst.

Similarly, the other starting compounds, such as the compounds of the formula H—E—$NH_2$ and H—K—N ($R^1$)H and also the fiber-reactive starting compounds of the formula X°—Z, have been described many times in the literature and have been widely employed for preparing fiber-reactive dyes (see for example European Patent Application Publication Nos 0 541 057, 0 542 214 and 0 548 795) or can be prepared using appropriate starting compounds in analogy to the procedures indicated therein.

Examples of starting compounds of the formula (22) are 4-aminobenzimidazolin-2-one, 5-aminobenzimidazolin-2-one, 1-N-(4'-sulfophenyl)-5-aminobenzimidazolin-2-one, 1-N-(3'-sulfophenyl)-5-aminobenzimidazolin-2-one, 1-N-(6',8'-disulfonaphth-2'-yl)-5-aminobenzimidazolin-2-one, 6-aminoquinoxaline-2,3-dione, 7-methyl-6-aminoquinoxaline-2,3-dione, 7-methoxy-6-aminoquinoxaline-2,3-dione, 7-ethoxy-6-aminoquinoxaline-2,3-dione, 4-N-(4'-sulfophenyl)-6-amino-quinoxaline-2,3-dione, 4-N-(3'-sulfophenyl)-6-aminoquinoxaline-2,3-dione, 4-N-(2',5'-disulfophenyl)-6-aminoquinoxaline-2,3-dione, 4-N-(6',8'-disulfonaphth-2'-yl)-6-aminoquinoxaline-2,3-dione, 4-N-(4',6',8'-trisulfonaphth-2'-yl)-6-aminoquinoxaline-2,3-dione, 5-aminooxazoline-2-one, 6-chloro-5-aminooxazolin-2-one, 6-amino-quinazoline-2,4-dione, 7-aminoquinazolin-2,4-dione, 7-amino-3,4-dihydro-quinolin-2-one, 6-amino-1,3-dihydroindol-2-one, 5-amino- 1,2-benzisothiazolin-3-one 1,1-dioxide, 6-amino- 1,2-benzisothiazolin-3-one 1,1-dioxide, 5-aminophthalimide, 5-amino-N'-(4'-sulfophenyl) phthalimide, 5-amino-N'-(3'-sulfophenyl)phthalimide, 5-amino-N'-(5',7'-disulfo-naphth-2'-yl)phthalimide, 5-amino-N'-(6',8'-disulfonaphth-2'-yl)-phthalimide, 7-aminochinolin-2-one, 7-amino-4-methylquinolin-2-one, 7-amino-4-ethylquinolin-2-one, 7-amino-4-phenylquinolin-2-one, 4-(N-methyl)aminobenzimidazolin-2-one, 4-[N-(β-sulfoethyl)amino]-benzimidazolin-2-one, 7-(N-ethylamino) quinolin-2-one and 7-(N-ethyl-amino)-3,4-dihydroquinolin-2-one.

The deposition of the dyes of the formula (1) prepared in accordance with the invention from the synthesis mixtures takes place in accordance with generally known methods either by precipitation from the reaction medium by means of electrolytes, for example sodium chloride or potassium chloride, or by evaporative concentration of the reaction solution, for example by means of spray drying, in which case a buffer substance can be supplied to this reaction solution.

The dyes of the formula (1)—referred to as dyes (1) below—are suitable for dyeing and printing a wide variety of materials, such as silk, leather, wool, polyamide fibers and polyurethanes, and especially cellulosic fiber materials of all kinds. Examples of such fiber materials are the natural cellulose fibers, such as cotton, linen and hemp, and also viscose staple and regenerated cellulose. The dyes (1) are also suitable for dyeing or printing hydroxy-containing fibers in blend fabrics, for example blends of cotton with polyester fibers or polyamide fibers.

The dyes (1) can be applied to the fiber material and fixed on the fiber in various ways, in particular in the form of aqueous dye solutions and dye print pastes. They are suitable both for the exhaust process and for dyeing by the pad dyeing process, after which the goods are impregnated with aqueous dye solutions with or without a content of salt and the dye is fixed after an alkali treatment or in the presence of alkali, with or without the action of heat. The novel dyes are particularly suitable for the cold pad-batch process, where the dye is applied together with the alkali on the padder and then is fixed by storage for several hours at room temperature. After fixing, the dyeings or prints are rinsed thoroughly with cold and hot water, with or without the addition of a composition which has a dispersing action and which promotes the diffusion of the unfixed portions. These dyeing and printing processes have been described on numerous occasions in both the technical literature and in the patent literature, as for example in the documents cited at the outset.

The present invention therefore also provides for the use of the dyes (1) for the dyeing (including the printing) of these materials and provides methods of dyeing (and printing) such materials in a procedure which per se is conventional, in which a dye (1) is employed as colorant, by applying the dye (1) in an aqueous medium to the material and fixing it on the material by means of heat or by means of an alkaline compound, or both.

The dyes (1) feature high reactivity, good fixing capacity and a very good build-up power. They can therefore be employed at low dyeing temperatures by the exhaust dyeing process, and require only short steam times in the case of the pad-steam process. The degrees of fixing are high, and the unfixed portions can be washed off easily after the dyeing process without the dye which is detached soiling white laundry that is also present in the washing process. This has advantages for the dyeing process; wash cycles, and therefore costs, can be saved. The difference between degree of exhaustion and degree of fixing being remarkably low; in other words, the soaping loss is very small.

The dyes (1) are also suitable particularly for printing, especially on cotton, but also for the printing of nitrogen-containing fibers, for example wool or silk or blend fabrics comprising wool or silk.

The dyeings and prints produced with the dyes (1), especially on cellulosic fiber materials, possess high color strength and a high fiber-dye bond stability both in the acidic and in the alkaline range, and also good light fastness and very good wet fastness properties, such as fastnesses to washing, water, saltwater, cross-dyeing and perspiration, and also good fastness to dry heat setting, to ironing and to rubbing.

The Examples which follow serve to illustrate the invention. The parts are parts by weight and the percentages are percentages by weight unless stated otherwise. The relationship between parts by weight and parts by volume is that of the kilogram to the liter.

5-aminobenzimidazolin-2-one are added to the reaction mixture. A pH of 6 to 6.5 is established and maintained using aqueous lithium hydroxide solution.

The mixture is subsequently stirred for an hour, during which the temperature rises to 20° C.

b) To the solution of the coupling component prepared in this way there is added a diazonium salt solution, prepared in the customary manner from 30.4 parts of 2-amino-1,5-disulfonaphthalene in 150 parts of water using 30 parts by volume of 31% strength aqueous hydrochloric acid and 20.2 parts by volume of an aqueous 5N sodium nitrite solution, and the coupling reaction is conducted at a pH of from 6.5 to 7 and at a temperature which rises slowly from 5° C. to 20° C. Stirring is continued for a while and the novel dye which, written in the form of the free acid, has the formula

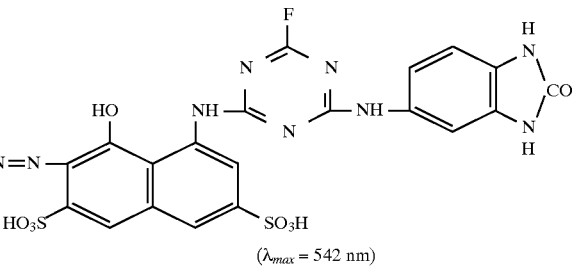

($\lambda_{max}$ = 542 nm)

The compounds described by way of formulae in the Examples are indicated in the form of the free acid; in general they are prepared and isolated in the form of their alkali metal salts, such as lithium, sodium or potassium salts, and are used for dyeing in the form of their salts. Similarly, the starting compounds and components stated in the form of the free acid in the subsequent Examples, especially the Tabular Examples, can be employed in the synthesis as they are or in the form of their salts, preferably alkali metal salts. The absorption maxima ($\lambda_{max}$) indicated for the novel dyes in the visible range were determined from aqueous solutions of alkali metal salts. In the Tabular Examples the $\lambda_{max}$ values are put in brackets when the hue is indicated; the wavelength indicated is in nm.

EXAMPLE 1 a) 31.8 parts of 1-amino-8-hydroxy-3,6-disulfonaphthalene are dissolved in 200 parts of water at a pH of 7. Following the addition of 200 parts of ice and 1.7 parts of sodium fluoride, 13.7 parts of cyanuric fluoride (2,4,6-trifluorotriazine) are added rapidly with intense stirring at 0° to 3° C. Then 14.9 parts of is isolated in the customary manner, for example by salting out with sodium chloride or by spray-drying the synthesis solution.

The novel monoazo dye shows very good fiber-reactive dye properties and, when employed according to the dyeing and printing processes customary in the art for fiber-reactive dyes, produces strong red and fast shades on the fiber materials specified in the description, especially cellulosic fiber materials such as cotton.

EXAMPLE 2

To a solution prepared in accordance with the information of Example 1a) there is added a diazonium salt solution prepared in a customary manner from 17 parts of 2-sulfoaniline using 20 parts by volume of 31% strength aqueous hydrochloric acid and 20 parts by volume of an aqueous 5N sodium nitrite solution, the pH is adjusted to 7, and the mixture is subsequently stirred for a while at from about 15° to 20° C. during which the pH is maintained. A buffer mixture comprising primary and secondary sodium phosphate is added to the resulting dye solution, and the novel monoazo dye obtained of the formula (written in the form of the free acid)

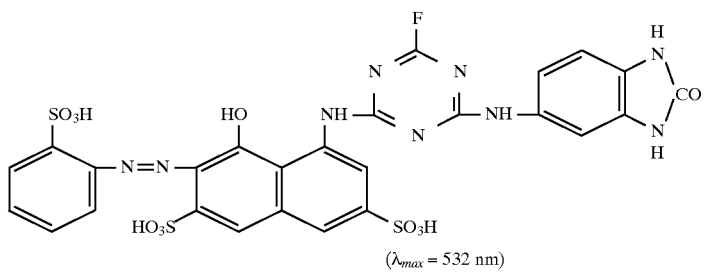

($\lambda_{max}$ = 532 nm)

is isolated in a customary manner, for example by salting out with sodium chloride.

The novel dye shows very good applications-related and fiber-reactive properties and, when employed according to the dyeing and printing processes customary in the art for fiber-reactive dyes on the materials specified in the description, especially cellulosic fiber materials, produces dyeings in strong red shades which have good fastness properties, among which particular mention can be made of the good fastnesses to chlorinated bathing water.

EXAMPLE 3

To a solution prepared in accordance with the information of Example 1a) there is added a diazonium salt suspension prepared in a customary manner from 41 parts of 1-sulfo-6-(β-sulfatoethylsulfonyl)-2-amino-naphthalene in 1000 parts of water at 0° C. using 30 parts of 31% strength aqueous hydrochloric acid and 20 parts of an aqueous 5N sodium nitrite solution, the pH is adjusted to 7, and the mixture is subsequently stirred for a while at from about 15° to 20° C. during which the pH is maintained. 12 parts of disodium hydrogen phosphate are added to the dye solution thus prepared and a pH of 7 is established using phosphoric acid.

The novel azo dye obtained of the formula (written in the form of the free acid)

dye shows very good applications-related properties and, when employed by the application methods customary for fiber-reactive dyes, produces, for example on cellulosic fiber materials and with a high degree of fixing, bright, bluish red dyeings which have good fastness properties, among which particular mention may be made of the fastness to chlorinated bathing water.

EXAMPLE 4

1.1 parts of sodium chloride are added to a solution of 24.8 parts of the sodium salt of the monoazo compound 7-(2'-sulfo-4'-methoxyphenyl-azo)-3-amino-6-sulfo-8-naphthol in 300 parts of water and the mixture is cooled to zero to 3° C. Following the addition of 150 parts of ice, 6.8 parts of cyanuric fluoride are added rapidly with intense stirring. After 10 minutes, 7.5 parts of 5-aminobenzimidazolin-2-one are added to the reaction mixture and the pH is adjusted to 7 to 7.5 with aqueous sodium carbonate solution and is maintained for an hour, during which stirring is continued and the temperature rises to 20° C.

The novel azo dye which, written in the form of the free acid, has the formula

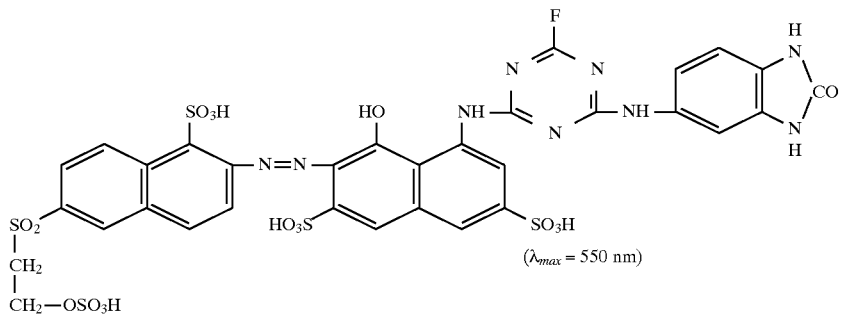

($\lambda_{max}$ = 550 nm)

is isolated in a customary manner, for example by evaporative concentration under reduced pressure at 40° C. The

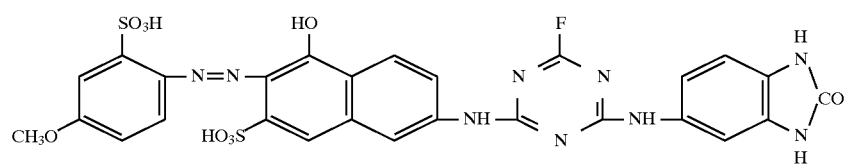

($\lambda_{max}$ = 509 nm)

-continued is isolated in the customary manner, for example by salting out with sodium chloride, as the alkali metal salt. It shows very good applications-related properties and on the fiber materials specified in the description, such as wool and especially cellulosic fiber material such as cotton, produces strong, bright, scarlet dyeings having good fastness properties.

EXAMPLE 5

While maintaining a pH of between 7.5 and 8 and a temperature of about 0° C., 14.2 parts of cyanuric fluoride are added slowly to a neutral solution of 54.5 parts of the azo compound 4-(3',6',8'-trisulfo-naphth-2'-yl)azo-3-ureidoaniline in 800 parts of water. The mixture is stirred for a while while maintaining these reaction conditions, until the reaction is over, and then 15.6 parts of 5-aminobenzimidazolin-2-one are added at about 5° C. and while maintaining the pH at between 6 and 7. The mixture is stirred for a while longer and the reaction temperature is allowed to rise to 20° C.

After the end of the reaction the novel dye of the formula (written in the formula of the free acid)

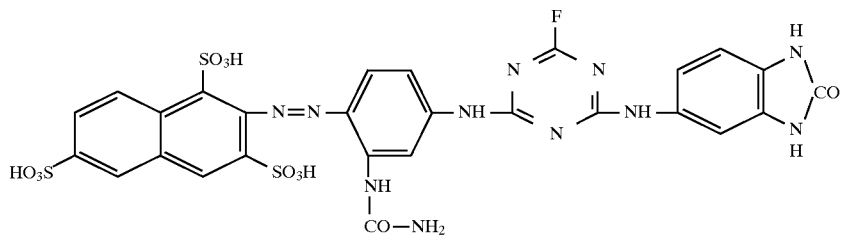

($\lambda_{max}$ = 420 nm)

is isolated in a customary manner as the alkali metal salt (sodium salt). It shows very good fiber-reactive dye properties and, when employed according to the application and fixing processes customary in the art for fiber-reactive dyes, on the materials specified in the description, especially cellulosic fiber materials, produces strong reddish yellow dyeings having good fastness properties.

EXAMPLE 6

7.2 parts of cyanuric fluoride are added with thorough stirring and while maintaining a pH of between 6.5 and 7 using an aqueous sodium carbonate solution to a solution of 21.1 parts of 4-(4',8'-disulfo-naphth-2'-yl)azo-3-acetylaminoaniline in 1000 parts of water at a temperature of 0° to 2° C. and at a pH of 8.5. The mixture is subsequently stirred for about 10 minutes and then, at about 5° C., 9.0 parts of 5-aminobenzimidazolin-2-one in 200 parts of water are added and the reaction is continued to its end at a pH of 6.5 and at a temperature of about 20° C.

The novel azo dye of the formula (written in the form of a free acid)

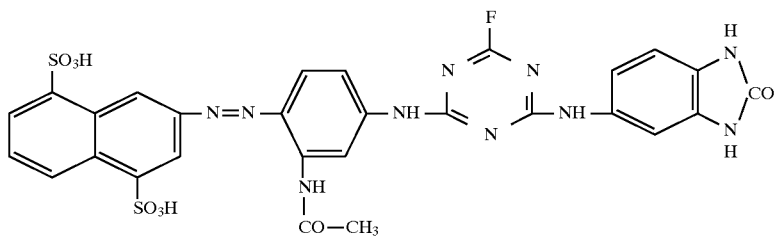

($\lambda_{max}$ = 390 nm)

is isolated in a customary manner, for example by salting out with sodium chloride. It possesses very good fiber-reactive, applications-related properties and dyes the materials specified in the description, for example cotton, in greenish yellow shades having good fastness properties.

EXAMPLE 7

A solution of 10 parts of 2,4,6-trichloro-1,3,5-triazine (cyanuric chloride) in 100 parts of acetone is added over the course of 30 minutes with thorough stirring and while maintaining a pH of 7.5 to a solution of 21.1 parts of 4-(4',8'-disulfonaphth-2'-yl)azo-3-acetylaminoaniline in a mixture of 500 parts of water and 200 parts of ice. The mixture is subsequently stirred at a pH of 7.5 for about 10 minutes, and then a solution of 12.5 parts of 7-methoxy-6-aminoquinoxaline-2,3-dione in 200 parts of water is added. The reaction is continued to its end for about 3 hours while maintaining a pH of 6 and a temperature of 35° to 40° C.

The novel dye of the formula (written in the form of a free acid)

is isolated in a customary manner, for example by salting out with sodium chloride.

The novel dye shows very good applications-related and fiber-reactive properties and, when employed according to the dyeing and printing processes customary in the art for fiber-reactive dyes, on the materials specified in the description, especially cellulosic fiber materials, produces strong red dyeings having good fastness properties, among

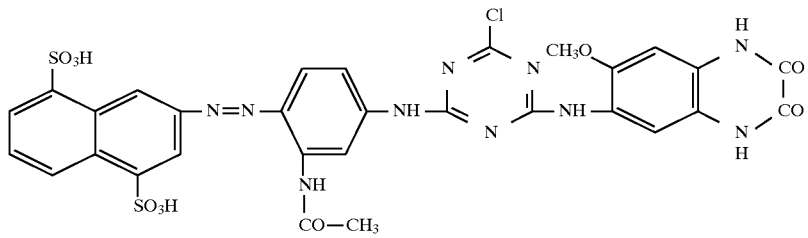

($\lambda_{max}$ = 392 nm)

is isolated in a customary manner, for example by evaporative concentration of the aqueous synthesis solution under reduced pressure at 60° C., as the alkali metal salt. The dye shows very good applications-related properties and, for example, dyes cotton by the dyeing and printing processes customary for fiber-reactive dyes, in greenish yellow shades having good fastness properties.

EXAMPLE 8

9.8 parts of cyanuric chloride are added with thorough stirring and while maintaining a pH of 4 to 4.5 to a solution, having a pH of 5.5, of 16 parts of 1-amino-8-hydroxynaphthalene-3,6-disulfonic acid in 200 parts of water, at 0° to 3° C. The mixture is subsequently stirred for a while at a pH of 4.5, it is heated to 25° C., and then 9.5 parts of 6-aminoquinazoline-2,4-dione are added and the reaction is carried out at a pH of about 5 and at a temperature which slowly rises from 5° C. to 35° C. Then a diazonium salt solution, prepared in a customary manner from 8.7 parts of 2-sulfoaniline in 100 parts of water using 10 parts by volume of concentrated aqueous hydrochloric acid and 25 parts by volume of an aqueous 2N sodium nitrite solution, is added and the coupling reaction is conducted at a pH of 6 and at a temperature which rises slowly from 5° C. to 20° C. Stirring is continued for a while and the novel dye which, written in the form of the free acid, has the formula which particular mention may be made of the good fastnesses to chlorinated bathing water.

EXAMPLE 9

9.5 parts of cyanuric chloride are added to a neutral solution of 18.1 parts of the azo compound 7-(2'-sulfo-4'-methoxyphenyl)-azo-6-sulfo-8-hydroxy-3-aminonaphthalene in 500 parts of water, while maintaining a pH of from 5 to 6 and a temperature of 0° C., the mixture is subsequently stirred for a while and is heated to 25° C., and, while maintaining the stated pH range, 10.3 parts of 5-amino-1,2-benzisothiazolin-3-one 1,1-dioxide are added and the reaction temperature is raised slowly to 40° C. After the end of the reaction the novel dye obtained which, written in the form of the free acid, has the formula

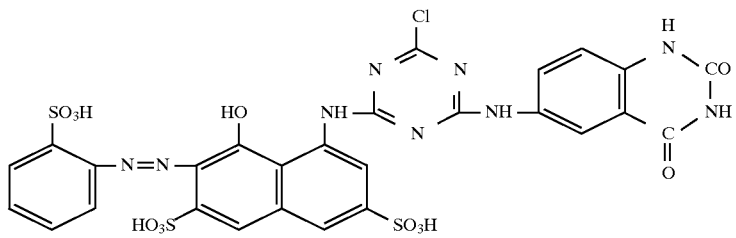

($\lambda_{max}$ = 532 nm)

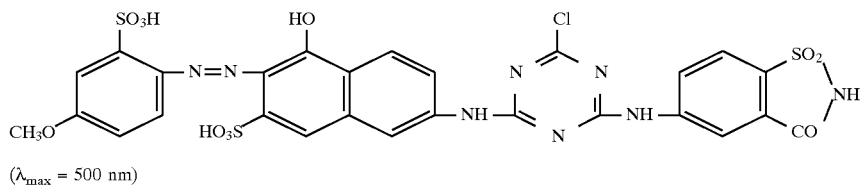

(λ_max = 500 nm)

is isolated in a customary manner, for example by salting out with sodium chloride, as the alkali metal salt.

The novel dye shows very good applications-related properties and dyes the fiber materials specified in the description, such as wool, and especially cellulosic fiber materials such as cotton, in strong yellowish red shades having good fastness properties.

EXAMPLE 10

1.1 parts of sodium fluoride are added to a solution of 37.3 parts of the sodium salt of the compound 7-(1',5'-disulfonaphth-2'-yl)azo-3-amino-6-sulfo-8-naphthol in 180 parts of water and the mixture is cooled to 0° to 3° C. Following the addition of 150 parts of ice, 6.8 parts of cyanuric fluoride are added rapidly with intense stirring. After stirring for 10 minutes, 8.8 parts of 6-amino-4-methylquinolin-2-one are added to the reaction mixture, and the pH of the latter is adjusted with aqueous sodium carbonate solution to 7 to 7.5 and is maintained during the reaction for an hour with stirring, during which the temperature rises to 20° C.

The novel azo dye is isolated in a customary manner as alkali metal salt (sodium salt). Written in the form of the free acid, it has the formula parts of sodium fluoride, 15.0 parts of cyanuric fluoride (2,4,6-trifluorotriazine) are added rapidly with intense stirring at 0° to 3° C. Then 14.9 parts of 5-aminobenzimidazolin-2-one are added to the reaction mixture. A pH of 7 to 7.5 is established and maintained using aqueous sodium hydroxide solution.

The mixture is subsequently stirred for an hour, during which the temperature rises to 20° C.

b) To the solution of the coupling component prepared in this way there is added a diazonium salt solution, prepared in the customary manner from 30.4 parts of 2-amino-1,5-disulfonaphthalene in 150 parts of water using 30 parts by volume of 31% strength aqueous hydrochloric acid and 20.2 parts by volume of an aqueous 5N sodium nitrite solution, and the coupling reaction is conducted at a pH of from 6.5 to 7 and at a temperature which rises slowly from 5° C. to 20° C. Stirring is continued for a while and the novel dye which, written in the form of the free acid, has in the formula

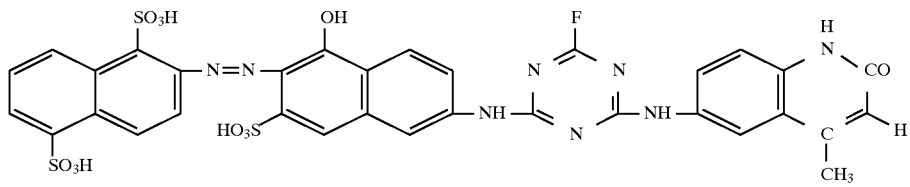

(λ_max = 494 nm).

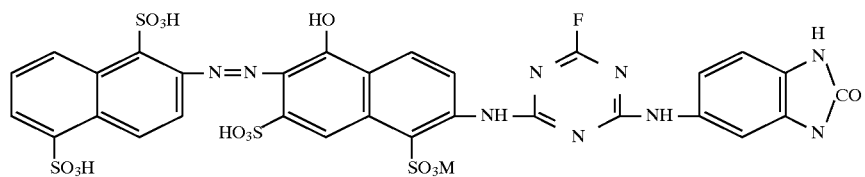

(λ_max = 489 nm)

It shows good fiber-reactive dye properties and dyes the materials specified in the description, especially cellulosic fiber material such as cotton, in strong, brilliant orange shades.

EXAMPLE 11 a) 31.8 parts of 3-amino-8-hydroxy-4,6-disulfonaphthalene are dissolved in 200 parts of water at a pH of 7. Following the addition of 200 parts of ice and 1.7 is isolated in the customary manner, for example by salting out with sodium chloride or by spray-drying the synthesis solution.

The novel monoazo dye shows very good fiber-reactive dye properties and, when employed according to the dyeing and printing processes customary in the art for fiber-reactive dyes, produces strong orange and fast shades on the fiber materials specified in the description, especially cellulosic fiber materials such as cotton.

EXAMPLES 12 to 85

The Tabular Examples below describe further novel dyes of the formula (A)

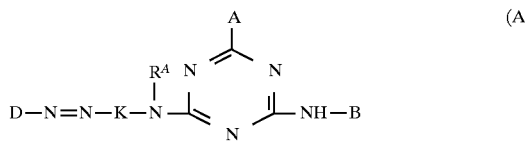

by reference to their components (the radical D of the diazo component $D—NH_2$, the radical $—K—N(R^A)—$ of the amino-containing coupling component of the formula $H—K—N(R^A)H$ and the substituents A and B). They can be prepared in one of the novel procedures, for example in analogy to one of the above Working Examples. They possess very good fiber-reactive dye properties and dye cotton, for example, in the hue indicated in the respective Tabular Example, in high color strength and with good fastness properties.

| | | Dye of the formula (A) | | | |
|---|---|---|---|---|---|
| Ex. | Radical D— | Radical —K—N($R^A$)— | Radical A | Radical B | Hue |
| 12 | 4-(βSulfatoethylsulfonyl)-phenyl | 3,6-Disulfo-8-hydroxy-naphth-7,1-ylene-1-amino | Fluorine | Benzimidazolin-2-one-5-yl | bluish red (538) |
| 13 | 2-Methoxy-5-methyl-4-(β-sulfatoethylsulfonyl)phenyl | 3,6-Disulfo-8-hydroxy-naphth-7,1-ylene-1-amino | Fluorine | " | reddish violet (561) |
| 14 | 2-Bromo-4-(β-sulfato-ethylsulfonyl)phenyl | 3,6-Disulfo-8-hydroxy-naphth-7,1-ylene-1-amino | Fluorine | " | bluish red (537) |
| 15 | 2-Sulfo-4-(β-sulfato-ethylsulfonyl)phenyl | 3,6-Disulfo-8-hydroxy-naphth-7,1-ylene-1-amino | Fluorine | " | bluish red (525) |
| 16 | 3-(β-Sulfatoethylsulfonyl)-phenyl | 3,6-Disulfo-8-hydroxy-naphth-7,1-ylene-1-amino | Fluorine | " | bluish red (537) |
| 17 | 4-Methoxy-3-(β-sulfato-ethylsulfonyl)phenyl | 3,6-Disulfo-8-hydroxy-naphth-7,1-ylene-1-amino | Fluorine | " | bluish red (557) |
| 18 | 2-Methoxy-5-(β-sulfato-ethylsulfonyl)phenyl | 3,6-Disulfo-8-hydroxy-naphth-7,1-ylene-1-amino | Fluorine | " | bluish red (558) |
| 19 | 4-Chloro-3-(β-sulfato-ethylsulfonyl)phenyl | 3,6-Disulfo-8-hydroxy-naphth-7,1-ylene-1-amino | Fluorine | " | bluish red (540) |
| 20 | 2-Carboxy-5-(β-sulfato-ethylsulfonyl)phenyl | 3,6-Disulfo-8-hydroxy-naphth-7,1-ylene-1-amino | Fluorine | " | bluish red (550) |
| 21 | 3-Sulfophenyl | 3,6-Disulfo-8-hydroxy-naphth-7,1-ylene-1-amino | Fluorine | " | red (534) |
| 22 | 4-Sulfophenyl | 3,6-Disulfo-8-hydroxy-naphth-7,1-ylene-1-amino | Fluorine | " | red (532) |
| 23 | 2-Sulfo-4-methylphenyl | 3,6-Disulfo-8-hydroxy-naphth-7,1-ylene-1-amino | Fluorine | " | bluish red (542) |
| 24 | 2,5-Disulfophenyl | 3,6-Disulfo-8-hydroxy-naphth-7,1-ylene-1-amino | Fluorine | " | red (535) |
| 25 | 1-Sulfo-6-(β-sulfato-ethylsulfonyl)-naphth-2-yl | 3,6-Disulfo-8-hydroxy-naphth-7,1-ylene-1-amino | Fluorine | " | bluish red (538) |
| 26 | 6-Sulfo-8-(β-sulfato-ethylsulfonyl)naphth-2-yl | 3,6-Disulfo-8-hydroxy-naphth-7,1-ylene-1-amino | Fluorine | " | red (527) |
| 27 | 1-Sulfo-6-carboxynaphth-2-yl | 3,6-Disulfo-8-hydroxy-naphth-7,1-ylene-1-amino | Fluorine | " | bluish red (538) |
| 28 | 2-Sulfophenyl | 3,6-Disulfo-8-hydroxy-naphth-7,1-ylene-1-amino | Fluorine | " | red (532) |
| 29 | 2-Sulfo-4-methylphenyl | 6-Sulfo-8-hydroxy-naphth-7,3-ylene-3-amino | Fluorine | Benz-1,2,3-oxathiazin-4-one 2,2-dioxide-6-yl | yellowish red (500) |
| 30 | 2,5-Disulfo-4-methoxy-phenyl | 6-Sulfo-8-hydroxy-naphth-7,3-ylene-3-(N-methyl)amino | Fluorine | 1,2-Benzoisothiazolin-3-one 1,1-dioxide-6-yl | yellowish red (496) |
| 31 | 1,5-Disulfonaphth-2-yl | 6-Sulfo-8-hydroxy-naphth-7,3-ylene-3-amino | Fluorine | 1,2-Benzoisothiazolin-3-one 1,1-dioxide-6-yl | orange (482) |
| 32 | " | 4,6-Disulfo-8-hydroxy-7,1-ylene-1-amino | Fluorine | 1,2-Benzoisothiazolin-3-one 1,1-dioxide-6-yl | red (535) |
| 33 | 2-Sulfophenyl | 4,6-Disulfo-8-hydroxy-7,1-ylene-1-amino | Fluorine | 1,2-Benzoisothiazolin-3-one 1,1-dioxide-6-yl | red (530) |
| 34 | 3,6,8-Trisulfonaphth-2-yl | 3-Ureidophen-4,1-ylene-1-amino | Fluorine | Quinazoline-2,4-dione-7-yl | reddish yellow (415) |
| 35 | 3,7-Disulfonaphth-2-yl | 3-Ureidophen-4,1-ylene-1-amino | Fluorine | " | yellow (418) |
| 36 | " | 3-Acetylaminophen-4,1-ylene-1-amino | Fluorine | " | yellow (406) |
| 37 | 4,6,8-Trisulfonaphth-2-yl | 3-Acetylaminophen-4,1-ylene-1-amino | Fluorine | " | yellow (403) |
| 38 | 4-Sulfophenyl | 3-Ureidophen-4,1-ylene-1-amino | Fluorine | " | yellow (384) |
| 39 | 2,4-Disulfophenyl | 3-Ureidophen-4,1-ylene-1-amino | Fluorine | " | yellow (401) |
| 40 | 1,5-Disulfonaphth-2-yl | 3-Ureidophen-4,1-ylene-1-amino | Fluorine | " | yellow (400) |

Dye of the formula (A)

| Ex. | Radical D— | Radical —K—N(R^A)— | Radical A | Radical B | Hue |
|---|---|---|---|---|---|
| 41 | 2-Sulfo-4-methoxyphenyl | 6-Sulfo-8-hydroxy-naphth-7,3-ylene-3-amino | Fluorine | " | yellowish red (500) |
| 42 | 2-Sulfo-4-methoxyphenyl | 3,6-Disulfo-8-hydroxy-naphth-7,1-ylene-1-amino | Fluorine | " | bluish red |
| 43 | 5,7-Disulfonaphth-2-yl | 4,1-Phenylene-1-(N-ethyl)amino | Fluorine | " | yellow (415) |
| 44 | 2,5-Disulfo-4-methoxy-phenyl | 3,6-Disulfo-8-hydroxy-naphth-7,1-ylene-1-amino | Fluorine | Benzimidazolin-2-one-5-yl | bluish red (560) |
| 45 | 2,5-Disulfo-4-methoxy-phenyl | 3,6-Disulfo-8-hydroxy-naphth-7,1-ylene-1-amino | Chlorine | Quinoxaline-2,3-dione-6-yl | bluish red (560) |
| 46 | 2-Carboxyphenyl | 3,6-Disulfo-8-hydroxy-naphth-7,1-ylene-1-amino | Chlorine | " | bluish red (545) |
| 47 | 1,5-Disulfonaphth-2-yl | 3,6-Disulfo-8-hydroxy-naphth-7,1-ylene-1-amino | Chlorine | " | bluish red (540) |
| 48 | 1,5-Disulfonaphth-2-yl | 3,6-Disulfo-8-hydroxy-naphth-7,1-ylene-1-amino | Chlorine | Benzimidazolin-2-one-5-yl | bluish red (540) |
| 49 | 2-Sulfophenyl | 3,6-Disulfo-8-hydroxy-naphth-7,1-ylene-1-amino | Chlorine | " | red (531) |
| 50 | 2-Sulfo-4-methylphenyl | 6-Sulfo-8-hydroxy-naphth-7,3-ylene-3-amino | Chlorine | " | scarlet (496) |
| 51 | 2,5-Disulfo-4-methoxy-phenyl | 6-Sulfo-8-hydroxy-naphth-7,3-ylene-3-(N-methyl)amino | Chlorine | " | scarlet (500) |
| 52 | 1,5-Disulfonaphth-2-yl | 6-Sulfo-8-hydroxy-naphth-7,3-ylene-3-amino | Chlorine | " | orange-red (485) |
| 53 | 3,6,8-Trisulfonaphth-2-yl | 3-Ureidophen-4,1-ylene-1-amino | Chlorine | " | reddish yellow (415) |
| 54 | 3,7-Disulfonaphth-2-yl | 3-Ureidophen-4,1-ylene-1-amino | Chlorine | " | yellow (418) |
| 55 | " | 3-Acetylamino-phen-4,1-ylene-1-amino | Chlorine | " | yellow (405) |
| 56 | 4,6,8-Trisulfonaphth-2-yl | 3-Acetylamino-phen-4,1-ylene-1-amino | Chlorine | " | yellow (403) |
| 57 | 4-Sulfophenyl | 3-Ureidophen-4,1-ylene-1-amino | Chlorine | " | yellow (406) |
| 58 | 2,4-Disulfophenyl | 3-Ureidophen-4,1-ylene-1-amino | Chlorine | " | yellow (401) |
| 59 | 1,5-Disulfonaphth-2-yl | 3-Ureidophen-4,1-ylene-1-amino | Chlorine | " | yellow (400) |
| 60 | 3,6,8-Trisulfonaphth-2-yl | 3-Ureidophen-4,1-ylene-1-amino | Chlorine | " | bluish red (540) |
| 61 | 4-(β-Sulfatoethylsulfonyl)-phenyl | 3-Ureidophen-4,1-ylene-1-amino | Chlorine | " | bluish red (537) |
| 62 | 2,5-Dimethoxy-4-(β-sulfatoethylsulfonyl)phenyl | 3-Ureidophen-4,1-ylene-1-amino | Chlorine | " | reddish violet (570) |
| 63 | 2-Methoxy-5-methyl-4-(β-sulfatoethylsulfonyl)phenyl | 3-Ureidophen-4,1-ylene-1-amino | Chlorine | " | bluish red (562) |
| 64 | 2-Bromo-4-(β-sulfato-ethylsulfonyl)phenyl | 3-Ureidophen-4,1-ylene-1-amino | Chlorine | " | bluish red |
| 65 | 2-Sulfo-4-(β-sulfato-ethylsulfonyl)phenyl | 3-Ureidophen-4,1-ylene-1-amino | Chlorine | " | red (530) |
| 66 | 3-(β-Sulfatoethylsulfonyl)-phenyl | 3-Ureidophen-4,1-ylene-1-amino | Chlorine | " | red (530) |
| 67 | 4-Methoxy-3-(β-sulfato-ethylsulfonyl)phenyl | 3-Ureidophen-4,1-ylene-1-amino | Chlorine | " | bluish red (555) |
| 68 | 2-Methoxy-5-(β-sulfato-ethylsulfonyl)phenyl | 3-Ureidophen-4,1-ylene-1-amino | Chlorine | " | bluish red (557) |
| 69 | 4-Chloro-3-(β-sulfato-ethylsulfonyl)phenyl | 3-Ureidophen-4,1-ylene-1-amino | Chlorine | " | red (535) |
| 70 | 2-Carboxy-5-(β-sulfato-ethylsulfonyl)phenyl | 3-Ureidophen-4,1-ylene-1-amino | Chlorine | " | bluish red (542) |
| 71 | 3-Sulfophenyl | 3-Ureidophen-4,1-ylene-1-amino | Chlorine | " | red (535) |
| 72 | 4-Sulfo | 3-Ureidophen-4,1-ylene-1-amino | Chlorine | " | red (530) |
| 73 | 2-Sulfo-4-methylphenyl | 3-Ureidophen-4,1-ylene- | Chlorine | " | bluish red |

-continued

Dye of the formula (A)

| Ex. | Radical D— | Radical —K—N(R^A)— | Radical A | Radical B | Hue |
|---|---|---|---|---|---|
| 74 | 2,5-Disulfophenyl | 1-amino 3-Ureidophen-4,1-ylene-1-amino | Chlorine | " | (542) red (531) |
| 75 | 1-Sulfo-6-(β-sulfato-ethylsulfonyl)naphth-2-yl | 3-Ureidophen-4,1-ylene-1-amino | Chlorine | " | red (540) |
| 76 | 6-Sulfo-8-(β-sulfato-ethylsulfonyl)naphth-2-yl | 3-Ureidophen-4,1-ylene-1-amino | Chlorine | " | red (530) |
| 77 | 1-Sulfo-6-carboxynaphth-2-yl | 3-Ureidophen-4,1-ylene-1-amino | Chlorine | " | bluish red (539) |
| 78 | 2-Sulfo-4-methoxyphenyl | 6-Sulfo-8-hydroxy-naphth-7,3-ylene-1-amino | Chlorine | " | yellowish red (500) |
| 79 | 2-Sulfo-4-methoxyphenyl | 6-Sulfo-8-hydroxy-naphth-7,3-ylene-1-amino | Chlorine | " | yellowish red (500) |
| 80 | 4-(1',5'-Disulfonaphth-2'-yl)-azo-6-sulfonaphth-1-yl | 6-Sulfonaphth-4,1-ylene-1-amino | Chlorine | " | red-brown (460) |
| 81 | 4-(1',5'-Disulfonaphth-2'-yl)-azo-6-sulfonaphth-1-yl | 8-Sulfonaphth-4,1-ylene-1-amino | Chlorine | " | red-brown (458) |
| 82 | 4-[4'-(β-Sulfato-ethylsulfonyl)phenyl]azo-6-sulfonaphth-1-yl | 8-Sulfonaphth-4,1-ylene-1-amino | Chlorine | " | red-brown (457) |
| 83 | 4-(4',8'-Disulfonaphth-2'-yl)-azo-(6,7)-sulfonaphthyl | 3-Methylphen-4,1-ylene-1-amino | Chlorine | " | red-brown (452) |
| 84 | 4-(4',8'-Disulfonaphth-2'-yl)-azo-(6,7)-sulfonaphthyl | 8-Sulonaphth-4,1-ylene-1-amino | Chlorine | " | red-brown (460) |
| 85 | 2,5-Dimethoxy-4-(β-Sulfato-ethylsulfonyl)phenyl | 3,6-Disulfo-8-hydroxy-naphth-7,1-yleneamino | Fluorine | " | reddish violet (570) |

EXAMPLE 86

15 parts of cyanuric fluoride are added slowly, while maintaining a pH of between 5 and 5.5 and a temperature of 0° to 5° C., to 680 parts of a neutral aqueous solution at 0° C. of 81 parts of the disazo compound 2-[4'-(β'-sulfatoethylsulfonyl)phenyl]azo-7-(2"-sulfo-5"-aminophenyl)azo-3,6-disulfo-1-amino-8-hydroxynaphthalene (which can be prepared in a customary manner by the coupling reaction of 3,6-disulfo-1-amino-8-naphthol with the diazonium salt of 4-(β-sulfatoethylsulfonyl)aniline in a strongly acidic range followed by the coupling reaction of the resulting monoazo compound with the monodiazonium salt of 1,3-diaminobenzene-6-sulfonic acid in a weakly acidic to neutral range) in 600 parts of water. The second condensation reaction is then conducted, following the addition of 17.9 parts of 5-aminobenzimidazolin-2-one, at a temperature of from 0° to 5° C. and at a pH of 7 to 7.5.

The novel disazo dye is isolated, following the addition of 1 part of disodium hydrogen phosphate and 3 parts of sodium dihydrogen phosphate, by evaporative concentration of the synthesis solution, for example by spray drying. The alkali metal salt (sodium salt) of the compound of the formula is obtained. The novel disazo dye has very good fiber-reactive dye properties and, when employed according to the dyeing and printing processes customary in the fiber-reactive dyes on cellulose fiber materials, for example, such as cotton, produces dyeings in bright blue to navy shades, depending on the amount of dye employed, with good fastness properties, among which particular mention may be made of the good fastnesses to chlorinated bathing water.

EXAMPLE 87

A solution of 19.8 parts of 1,3-diaminobenzene-4-sulfonic acid in 100 parts of water and 12.9 parts of 33% strength aqueous sodium hydroxide solution is added slowly at 5° to 10° C. over the course of 30 minutes to a suspension of 19.7 parts of cyanuric chloride in 50 parts of water and 85 parts of ice. The pH is adjusted to 4.0 to 4.5 using sodium carbonate and the mixture is subsequently stirred for one hour at 8° to 10° C.

The resulting suspension of the 2-sulfo-5-(dichlorotriazinylamino)aniline compound is mixed with 6.9 parts of sodium nitrite and 100 parts of ice and is diazotized at 0° to 5° C. using 68.4 parts of 20% strength aqueous sulfuric acid. The resulting diazonium salt suspension is added at 10° to 15° C. and at a pH of 6.0 to 6.5 to about 600 parts of an aqueous solution of 53 parts of the compound

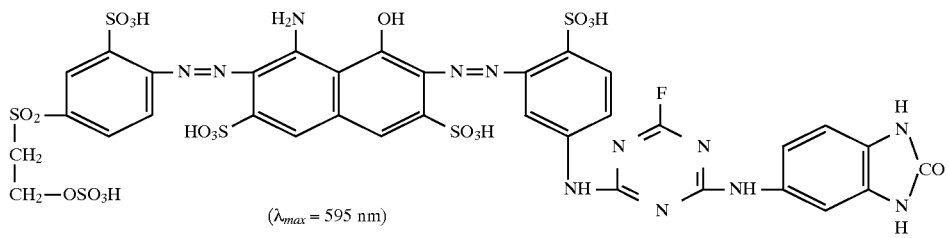

($\lambda_{max}$ = 595 nm)

1-amino-8-hydroxy-3,6-disulfo-2-[4'-(β-sulfatoethylsulfonyl)phenyl]azonaphthalene. The coupling reaction is conducted while maintaining this pH, then 31 parts of 5-amino-1-(4'-sulfophenyl)benzimidazolin-2-one are added and the condensation reaction is conducted at a pH of 6.0 to 6.5 and at a temperature of 40° to 45° C. for one hour.

The novel disazo dye of the formula (written in the form of the free acid)

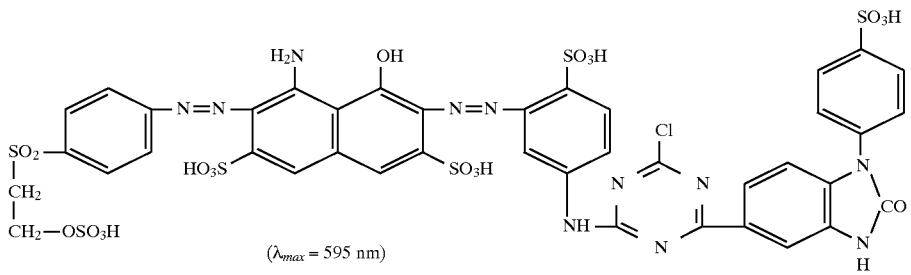

($\lambda_{max}$ = 595 nm)

is isolated as the alkali metal salt (sodium salt) in the form of a black, electrolyte-containing powder. It shows very good dye properties and on the materials specified in the description, especially cellulosic fiber materials, produces navy dyeings and prints having good fastness properties, among which particular mention may be made of the fastness to chlorinated bathing water.

EXAMPLE 88

To prepare a novel azo dye 23.0 parts of 2-sulfo-4-acetylaminoaniline in 100 parts of ice-water containing 6.9 parts of sodium nitrite in solution are diazotized by adding 5 parts of concentrated aqueous hydrochloric acid. The resulting diazonium salt suspension is then stirred at 0° to 5° C into a solution of 30.3 parts of 2-aminonaphthalene-5,7-disulfonic acid in 570 parts of water. The coupling reaction takes place at a temperature of 20° C. and a pH of 4.

When the coupling reaction is over, 150 parts of 33% strength aqueous sodium hydroxide solution are added and the acetylamino group is subjected to alkaline hydrolysis at 60° C. for about four hours. The solution thus obtained of the amino-containing azo compound is admixed at a temperature of 0° to 2° C. and while maintaining a pH of 4 to 5 with 15 parts of cyanuric fluoride. After the end of this condensation reaction 16.3 parts of 5-aminobenzimidazolin-2-one are added to the mixture, and the final condensation reaction is conducted at a pH of 6.5 to 7.5 and at a temperature of 5° to 10° C.

The resulting novel dye of the formula (written in the form of the free acid)

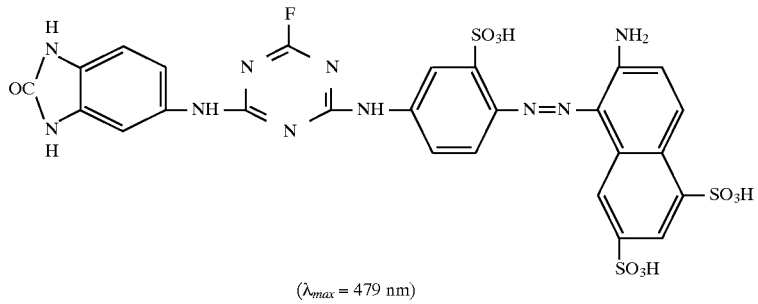

($\lambda_{max}$ = 479 nm)

is isolated in the customary manner, for example by salting out with sodium chloride. It shows very good fiber-reactive dye properties and produces on cellulosic fiber materials, for example, strong orange dyeings having good fastness properties.

EXAMPLE 89

17.5 parts of 1,3-diaminobenzene-4-sulfonic acid are added at a pH of between 2 and 2.5 and at a temperature of between 0° and 5° c. over the course of 20 minutes to a suspension of 18 parts of cyanuric chloride in 500 parts of water at 0° C., prepared with addition of a dispersant. Stirring is continued for one hour and then a neutral solution of 16.6 parts of 5-aminobenzimidazolin-2-one in 200 parts of water is added, the mixture is heated to 30° C., and the reaction is continued to its end at a pH of 5 for two hours. The reaction mixture is then cooled to 0° C., 20 parts of 31% strength aqueous hydrochloric acid are added, diazotization is carried out using 6.9 parts of sodium nitrite, stirring is continued at 0° C. for two hours, the resulting suspension is added to a solution of 19.6 parts of N-ethyl-4-methyl-3-aminocarbonyl-2-hydroxypyrid-6-one in 300 parts of water, and the coupling reaction is continued to its end at 20° C. and at a pH of 5 for three hours.

The novel azo dye has the formula (written in the form of the free acid)

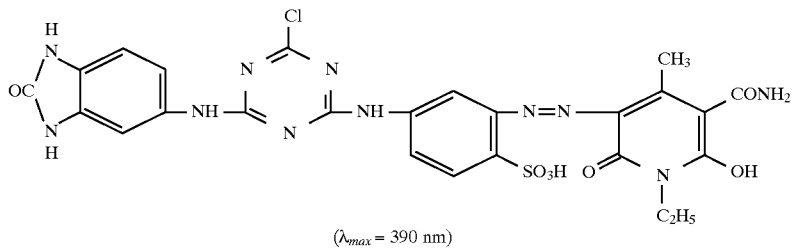

($\lambda_{max}$ = 390 nm)

and is isolated by evaporative concentration from the aqueous synthesis solution. It dyes cotton, for example, in bright yellow, fast hues with a high degree of fixing.

EXAMPLE 90

20 parts of 31% strength aqueous hydrochloric acid are added at 0° C. to a neutral solution of 23.0 parts of 1-acetylamino-3-aminobenzene-4-sulfonic acid in 300 parts of water, and diazotization is carried out with 6.9 parts of sodium nitrite. The resulting suspension is then added to a solution of 19.6 parts of N-ethyl-4-methyl-3-aminocarbonyl-2-hydroxypyrid-6-one in 150 parts of water and the coupling reaction is carried out to its end at 20° C. and at a pH of 5 for three hours.

To this reaction mixture there is then added 30 parts by volume of 31% strength aqueous hydrochloric acid, and the acetylamino group is hydrolyzed to the amino group at 100° C. for five hours. A pH of 7 is then established using aqueous sodium carbonate solution and the mixture is cooled to 0° C. Following the addition of 2.7 parts of sodium fluoride and 300 parts of ice, first 13.8 parts of cyanuric fluoride are added over the course of five minutes and then, after a further 15 minutes, 14.9 parts of 5-benzimidazolin-2-one are added, in each case with intense stirring. A pH of 7 is established and stirring is continued at about 20° C. for two hours. The novel azo dye, which corresponds in constitution to the dye of Example 88 and has the same good dyeing properties as the azo dye prepared in accordance with Example 88, is isolated.

EXAMPLES 91 to 122

The Tabular Examples which follow describe further novel azo dyes of the formula (B)

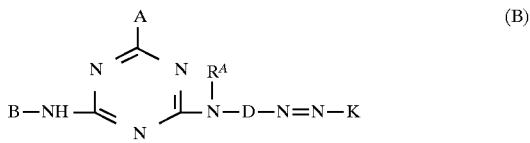

by means of the components evident from said formula. It can be prepared in one of the procedures according to the invention, for example in analogy to the information of Examples 86 to 90, by reaction of the starting compounds evident from the formula radicals. They possess very good fiber-reactive dye properties and, when employed according to the application and fixing processes customary for fiber-reactive dyes on the fiber materials specified in the description, especially cotton, produce strong dyeings and prints with the hue indicated in the respective Tabular Example for cotton.

Dyes of the formula (B)

| Ex. | Radical-N(R$^A$)—D— | Radical K | Radical A | Radical B | Hue |
|---|---|---|---|---|---|
| 91 | 2-Sulfophen-1,4-ylene-4-amino | 2-Amino-5,7-disulfonaphth-1-yl | Fluorine | Benzimidazolin-2-one-5-yl | orange (479) |
| 92 | 2-Sulfophen-1,4-ylene-4-amino | 2-Amino-5,7-disulfonaphth-1-yl | Chlorine | Benzimidazolin-2-one-5-yl | orange (487) |
| 93 | 6-Sulfophen-1,3-ylene-3-amino | N-Ethyl-3-aminocarbonyl-4-methyl-2-one-6-hydroxypyridin-5-yl | Chlorine | Benzimidazolin-2-one-5-yl | yellow (424) |
| 94 | 6-Sulfophen-1,3-ylene-3-amino | 1,4-Dimethyl-3-sulfo-2-one-6-hydroxypyridin-5-yl | Chlorine | Benzimidazolin-2-one-5-yl | greenish yellow (410) |
| 95 | 2-Sulfophen-1,4-ylene-4-amino | N-Ethyl-3-cyano-4-methyl-2-one-6-hydroxypyridin-5-yl | Chlorine | Benzimidazolin-2-one-5-yl | reddish yellow (442) |
| 96 | 2-Sulfophen-1,4-ylene-4-amino | 1-(4'-Sulfophenyl)-3-carboxy-5-one-pyrazol-4-yl | Chlorine | Benzimidazolin-2-one-5-yl | yellow (417) |
| 97 | 2-Sulfophen-1,4-ylene-4-amino | 1-(4'-(Sulfophenyl)-3-methyl-5-one-pyrazol-4-yl | Chlorine | 1-(4'-Sulfophenyl)-one-5-yl | greenish yellow (410) |
| 98 | 6-Sulfophen-1,3-ylene-3-amino | 1-[4'-(β-Sulfatoethylsulfonyl)-phenyl]-3-methyl-5-one-pyrazol-4-yl | Chlorine | 1-(4'-Sulfophenyl)-benzimidazolin-2-one-5-yl | greenish yellow (398) |
| 99 | 2-Sulfophen-1,4-ylene-4-amino | 2-[4'-(β-Sulfatoethylsulfonyl)-phenyl]azo-3,6-disulfo-1-amino-8-hydroxynaphth-7-yl | Fluorine | 1-(4'-Sulfophenyl)-benzimidazolin-2-one-5-yl | navy (600) |
| 100 | 1,4-Phenylene-4-amino | 2-[4'-(β-Sulfatoethylsulfonyl)-phenyl]azo-3,6-disulfo-1-amino-8-hydroxynaphth-7-yl | Fluorine | 1-(4'-Sulfophenyl)-benzimidazolin-2-one-5-yl | navy (602) |
| 101 | 2,5-Disulfophen-1,4-ylene-4-amino | 2-[4'-(β-Sulfatoethylsulfonyl)-phenyl]azo-3,6-disulfo-1-amino- | Fluorine | 1-(4'-Sulfophenyl)-benzimidazolin-2- | navy (598) |

Dyes of the formula (B)

| Ex. | Radical-N(R^A)—D— | Radical K | Radical A | Radical B | Hue |
|---|---|---|---|---|---|
| 102 | 1,3-Phenylene-3-amino | 8-hydroxynaphth-7-yl 2-[4'-(β-Sulfatoethylsulfonyl)-phenyl]azo-3,6-disulfo-1-amino-8-hydroxynaphth-7-yl | Fluorine | one-5-yl 4-Methylquinolin-2-one-6-yl | navy (596) |
| 103 | 2-Sulfophen-1,4-ylene-4-amino | 2-[4'-(β-Sulfatoethylsulfonyl)-phenyl]azo-3,6-disulfo-1-amino-8-hydroxynaphth-7-yl | Chlorine | 4-Methylquinolin-2-one-6-yl | navy (600) |
| 104 | 1,4-Phenylene-4-amino | 2-[4'-(β-Sulfatoethylsulfonyl)-phenyl]azo-3,6-disulfo-1-amino-8-hydroxynaphth-7-yl | Chlorine | 4-Methylquinolin-2-one-6-yl | navy (602) |
| 105 | 2,5-Disulfophen-1,4-ylene-4-amino | 2-[4'-(β-Sulfatoethylsulfonyl)-phenyl]azo-3,6-disulfo-1-amino-8-hydroxynaphth-7-yl | Chlorine | 4-Methylquinolin-2-one-6-yl | navy (598) |
| 106 | 1,3-Phenylene-3-amino | 2-[4'-(β-Sulfatoethylsulfonyl)-phenyl]azo-3,6-disulfo-1-amino-8-hydroxynaphth-7-yl | Chlorine | 4-Methylquinolin-2-one-6-yl | navy (597) |
| 107 | " | 2-[4'-(β-Sulfatoethylsulfonyl)-phenyl]azo-3,6-disulfo-1-amino-8-hydroxynaphth-7-yl | Chlorine | 3,4-Dihydroquinolin-2-one-7-yl | navy (595) |
| 108 | 1-Sulfonaphth-2,4-ylene-4-amino | 2-[4'-(β-Sulfatoethylsulfonyl)-phenyl]azo-3,6-disulfo-1-amino-8-hydroxynaphth-7-yl | Chlorine | 3,4-Dihydroquinolin-2-one-7-yl | navy (596) |
| 109 | 1-Sulfonaphth-2,5-ylene-5-amino | 2-[4'(β-Sulfatoethylsulfonyl)-phenyl]azo-3,6-disulfo-1-amino-8-hydroxynaphth-7-yl | Chlorine | 3,4-Dihydroquinolin-2-one-7-yl | navy (598) |
| 110 | 2,5-Disulfophen-1,4-ylene-4-amino | 2-Amino-5,7-disulfonaphth-1-yl | Fluorine | Benzimidazolin-2-one-5-yl | orange (487) |
| 111 | 6-Sulfophen-1,3-ylene-3-amino | N-Ethyl-3-aminocarbonyl-4-methyl-2-one-6-hydroxypyridin-5-yl | Fluorine | " | yellow (424) |
| 112 | 6-Sulfophen-1,3-ylene-3-amino | 1,4-Dimethyl-3-sulfo-2-one-6-hydroxypyridin-5-yl | Fluorine | " | greenish yellow (410) |
| 113 | 2-Sulfophen-1,4-ylene-4-amino | N-Ethyl-3-cyano-4-methyl-2-one-6-hydroxypyridin-5-yl | Fluorine | " | reddish yellow (442) |
| 114 | 2-Sulfophen-1,4-ylene-4-amino | 1-(4'-Sulfophenyl)-3-carboxy-5-one-pyrazol-4-yl | Fluorine | " | yellow 17) |
| 115 | 2-Sulfophen-1,4-ylene-4-amino | 1-(4'-Sulfophenyl)-3-carboxy-5-one-pyrazol-4-yl | Chlorine | " | " |
| 116 | 2-Sulfophen-1,4-ylene-4-amino | 1-(4'-Sulfophenyl)-3-methyl-5-one-pyrazol-4-yl | Fluorine | " | greenish yellow (410) |
| 117 | 2-Sulfophen-1,4-ylene-4-amino | 1-(4'-Sulfophenyl)-3-methyl-5-one-pyrazol-4-yl | Chlorine | " | greenish yellow (410) |
| 118 | 2-Sulfophen-1,4-ylene-4-amino | 3,6-Disulfo-1-(N-benzoylamino)-8-hydroxynaphth-7-yl | Fluorine | " | red (537) |
| 119 | 2-Sulfophen-1,4-ylene-4-amino | 3,6-Disulfo-1-(N-benzoylamino)-8-hydroxynaphth-7-yl | Chlorine | " | " |
| 120 | 2-Sulfophen-1,4-ylene-4-amino | 3,6-Disulfo-1-(N-benzoylamino)-8-hydroxynaphth-7-yl | Fluorine | " | red (525) |
| 121 | 1-Sulfonaphth-2,5-ylene-5-aminomethylene | 3,6-Disulfo-1-(N-benzoylamino)-8-hydroxynaphth-7-yl | Chlorine | " | rot (544) |
| 122 | 2,5-Disulfophen-1,4-ylene-4-amino | 2-Amino-5,7-disulfonaphth-1-yl | Fluorine | " | orange (487) |

EXAMPLE 123

A solution of 10 parts of cyanuric chloride in 100 parts of acetone is added over the course of about 15 minutes, with thorough stirring and while maintaining a pH of between 6.5 and 7 by means of aqueous sodium carbonate solution, to a solution of 29.8 parts of the starting compound N-(2-carboxy-5-sulfophenyl)-N'-(2"-hydroxy-3'-amino-5'-sulfophenyl)phenyl-copper formazan in a mixture of 300 parts of water and 300 parts of ice. The mixture is subsequently stirred for 15 minutes and then 9.0 parts of 5-aminobenzimidazolin-2-one in 270 parts of water are added and the reaction is continued to its end at a pH of 4 and at a temperature of from 30° to 35° C. over the course of about 3 hours.

The novel copper formazan dye of the formula (written in the form of the free acid)

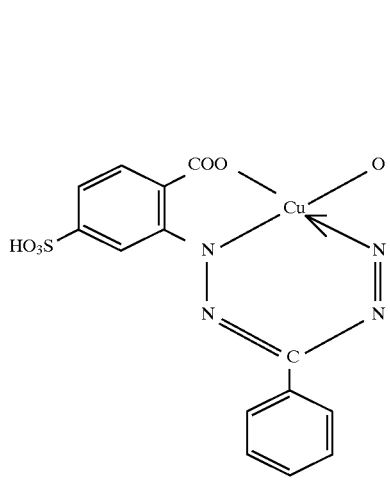

($\lambda_{max}$ = 608 nm)

is salted out from the synthesis solution using sodium chloride. When employed according to the dyeing procedures customary in the art for fiber-reactive dyes it dyes cotton, for example, in strong blue shades having good fastness properties.

EXAMPLE 124

7.1 parts of cyanuric chloride are added over the course of 30 minutes at 0° C. and while maintaining a pH of 5 to a neutral solution of 25.2 parts of 1-amino-4-(2'-methyl-3'-aminophenylamino)anthraquinone-2,5'-disulfonic acid, with thorough stirring. Stirring is continued for a while until the end of the reaction, at which point 15.5 parts of 5-amino-1-(4-sulfophenyl)benzimidazolin-2-one are added, the reaction is continued to its end at a pH of 8.5 and at a temperature of 5° C., and subsequently stirring is continued for a while at a pH of 7 and at 20° C.

The novel anthraquinone dye of the formula (written in the form of the free acid)

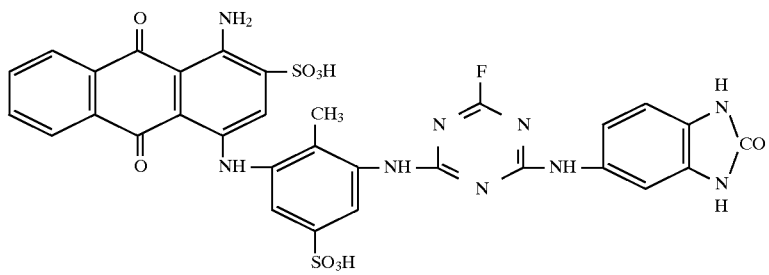

($\lambda_{max}$ = 592 nm)

is isolated from the synthesis solution by salting out with potassium chloride. It shows very good fiber-reactive dye properties and dyes the materials specified in the description, for example cellulosic fiber materials, in bright blue shades having good fastness properties.

EXAMPLE 125

29 parts of cyanuric fluoride are added slowly and with thorough stirring at 0° C. while maintaining a pH of between 5 and 6 to a neutral solution of 55 parts of the triphendioxazine compound of the formula

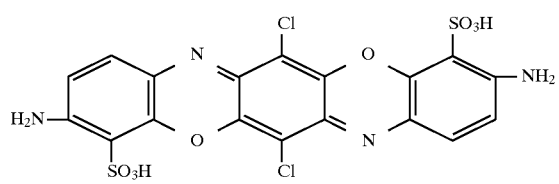

in 500 parts of water. Their mixture is stirred for a short time after which 31.4 parts of 5-aminobenzimidazolin-2-one are added and the reaction is continued to its end at 0° to 10° C. while maintaining a pH of 8 to 9.

The novel triphendioxazine dye which, written in the form of the free acid, has the formula

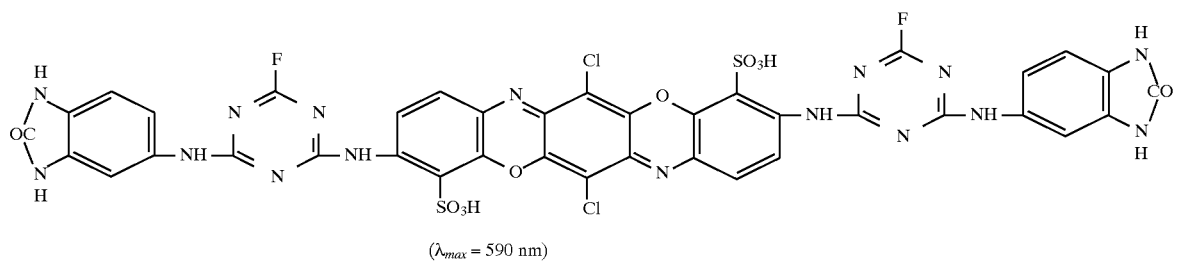

($\lambda_{max}$ = 590 nm)

is isolated by salting out with sodium chloride. It shows very good fiber-reactive dye properties and, when employed according to the application and fixing processes customary in the art for fiber-reactive dyes, it produces dyeings on the materials specified in the description, especially cellulosic fiber materials, in strong blue shades having good fastness properties.

EXAMPLE 126

58.9 parts of 2,9-diamino-6,13-dichloro-1,8-disulfotriphendioxazine are stirred into 1500 parts of water, and the pH is adjusted to 7 with aqueous lithium hydroxide solution. 60 parts of cyanuric chloride are added at 20° to 25° C., during which the pH is maintained at between 4 and 5 using aqueous lithium hydroxide solution. Stirring of the mixture is continued for a while until the reaction has ended, the precipitated dichlorotriazinylamino compound is filtered off with suction, the moist filter cake is dissolved in 1000 parts of water, and then 30.5 parts of 5-aminobenzimidazolin-2-one in solution in 200 parts of water are added, the temperature is raised to 60° C. and stirring is continued at a pH of between 4 and 5 until reaction is complete.

The novel triphendioxazine dye of the formula (written in the form of the free acid)

is isolated as alkali metal salt (sodium salt) by salting out with sodium chloride. The novel dye shows very good fiber-reactive properties and, when employed by the processes customary in the art for fiber-reactive dyes, on the materials specified in the description, especially cellulosic fiber materials, produces strong, bright reddish blue dyeings and prints in high fixing yields and with good fastness properties.

EXAMPLE 127

7.1 parts of cyanuric chloride are added over the course of about 30 minutes at 0° to 3° C. while maintaining a pH of 6 to 7 to a neutral solution of 50.3 parts of the compound 3-(m-amino-p-sulfophenyl-aminosulfonyl)-copper phthalocyanine-3',3",3'''-trisulfonic acid in 500 parts of water. The mixture is stirred for a while maintaining these process conditions, 7.8 parts of 5-aminobenzimidazolin-2-one are added, and the reaction is conducted at a pH of about 5 and at a temperature of about 35° C.

The resulting novel copper phthalocyanine dye of the formula (written in the form of the free acid)

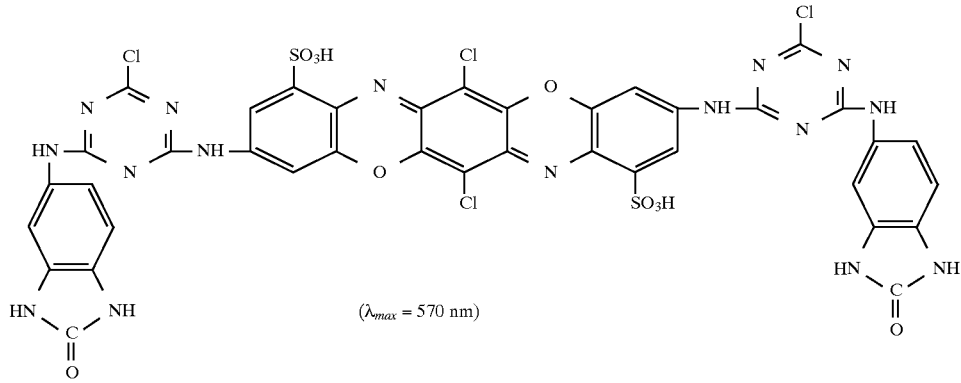

($\lambda_{max}$ = 570 nm)

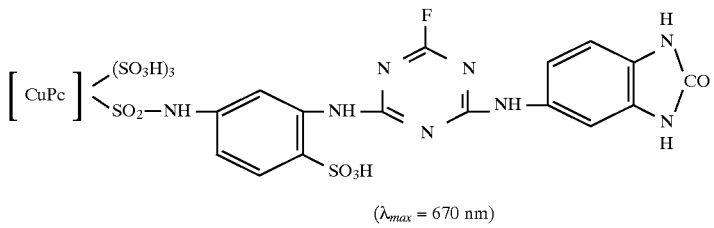

($\lambda_{max}$ = 670 nm)

is salted out from the synthesis solution by means of sodium chloride. It dyes, for example, cotton, viscose staple and regenerated cellulose in strong, fast, turquoise shades.

EXAMPLE 128

A novel copper phthalocyanine dye is prepared by following the procedure of Example 126 but replacing the copper phthalocyanine starting compound used therein by 3-(p-amino-m-sulfophenyl-aminosulfonyl)-copper phthalocyanine-3',3",3"'-trisulfonic acid.

The novel phthalocyanine dye shows an absorption maximum at 670 nm in the visible range, in aqueous solution, and, as a dye with good fiber-reactive properties produces, on cotton for example, strong, fast turquoise dyeings and prints.

We claim:

1. A dye of the formula (1)

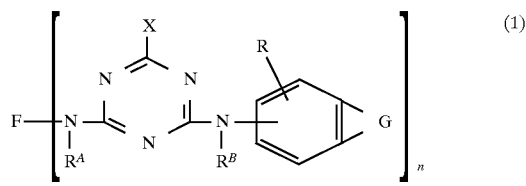

in which:
F is the radical of a sulfo-containing mono-, dis- or polyazo dye, or of a heavy metal complex mono-, dis- or trisazo dye or of an anthraquinone, azomethine, phenazine, stilbene, triphenylmethane, xanthene, thioxanthene, nitroaryl, naphthoquinone, pyrenequinone, perylenetetracarbimide, formazan, copper formazan, phthalocyanine, copper phthalocyanine, nickel phthalocyanine or cobalt phthalocyanine dye or triphendioxazine dye;

n is the number 1 or 2;

$R^A$ is hydrogen or alkyl of 1 to 4 C atoms unsubstituted or substituted by halogen, hydroxy, cyano, alkoxy of 1 to 4 C atoms, alkoxycarbonyl of 2 to 5 C atoms, carboxyl, sulfamoyl, sulfo, sulfato or phosphato;

$R^B$ is hydrogen or alkyl of 1 to 6 C atoms unsubstituted or substituted by halogen, hydroxy, cyano, alkoxy of 1 to 4 C atoms, alkoxycarbonyl of 2 to 5 C atoms, carboxy, sulfamoyl, sulfo, sulfato, phosphato, phenyl or sulfophenyl, or is phenyl unsubstituted or substituted by 1, 2 or 3 substituents selected from the group consisting of halogen, alkyl of 1 to 4 C atoms, alkoxy of 1 to 4 C atoms, sulfo and carboxy;

X is halogen;

R is hydrogen, alkyl of 1 to 4 C atoms, alkoxy of 1 to 4 C atoms, halogen or sulfo;

G forms at the benzene ring the radical of a heterocycle which includes at least one carboxamide group of the formula —CO—N($R^{10}$)— in which $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino;

the dye of formula (1) possesses at least one sulfo group.

2. The dye as claimed in claim 1, wherein F is the radical of a sulfo-containing mono- or disazo dye.

3. The dye as claimed in claim 1, wherein F is the radical of 1:1 copper complex mono- or disazo dye.

4. The dye as claimed in claim 1, wherein F is the radical of an anthraquinone dye.

5. The dye as claimed in claim 1, wherein F is the radical of a copper formazan dye.

6. The dye as claimed in claim 1, wherein F is the radical of a copper phthalocyanine or nickel phthalocyanine dye.

7. The dye as claimed in claim 1, wherein F is the radical of a triphendioxazine dye.

8. The dye as claimed in claim 1, wherein X is chlorine or fluorine.

9. The dye as claimed in claim 1, wherein $R^A$ is hydrogen.

10. The dye as claimed in claim 2, wherein X is chlorine or fluorine and $R^A$ is hydrogen.

11. The dye as claimed in claim 5, wherein X is chlorine or fluorine and $R^A$ is hydrogen.

12. The dye as claimed in claim 7, wherein X is chlorine or fluorine and $R^A$ is hydrogen.

13. The dye as claimed in claim 1, wherein G is a group of the formula (a), (b) (c), (d), (e), (f), (g), (h) or (j)

-continued

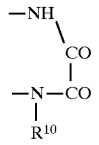 (e)

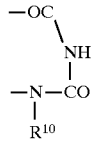 (f)

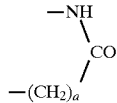 (g)

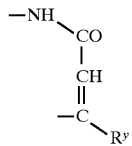 (h)

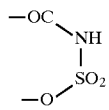 (j)

in which $R^{10}$ has the meaning given in claim 1, the index a in formula (g) is the number 1 or 2 and $R^y$ is hydrogen or alkyl of 1 to 4 C atoms which is unsubstituted or substituted by alkoxy of 1 to 4 C atoms, carboxy, sulfo, sulfato or phosphate, or is phenyl or naphthyl.

14. The dye as claimed in claim 1, wherein G is a group of the formula (a), (b), (c), (e), (f) or (h)

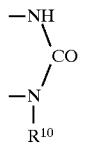 (a)

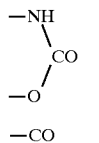 (b)

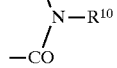 (c)

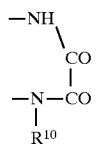 (e)

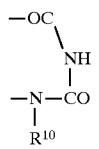 (f)

-continued

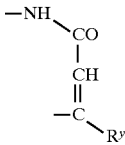 (h)

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^Y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

15. The dye as claimed in claim 2, wherein G is a group of the formula (a), (b), (c), (e), (f) o r (h)

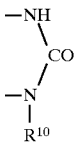 (a)

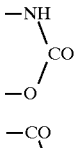 (b)

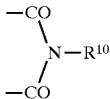 (c)

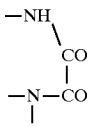 (e)

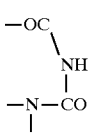 (f)

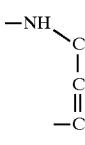 (h)

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^Y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

16. The dye as claimed in claim 3, wherein G is a group of the formula (a), (b), (c), (e), (f) or (h)

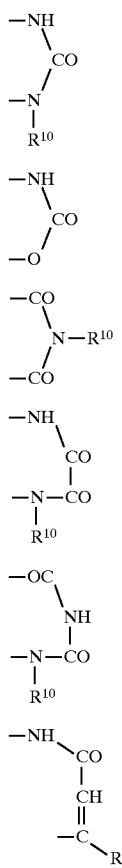
(a)
(b)
(c)
(e)
(f)
(h)

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

17. The dye as claimed in claim 4, wherein G is a group of the formula (a), (b), (c), (e), (f) or (h)

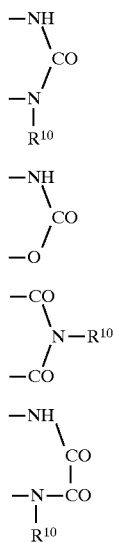
(a)
(b)
(c)
(e)

(f)

(h)

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

18. The dye as claimed in claim 5, wherein G is a group of the formula (a), (b), (c), (e), (f) or (h)

(a)

(b)

(c)

(e)

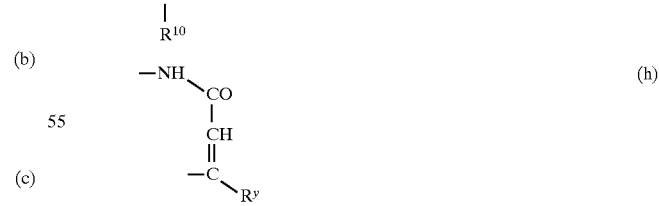
(f)

(h)

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

19. The dye as claimed in claim 6, wherein G is a group of the formula (a), (b), (c), (e), (f) or (h)

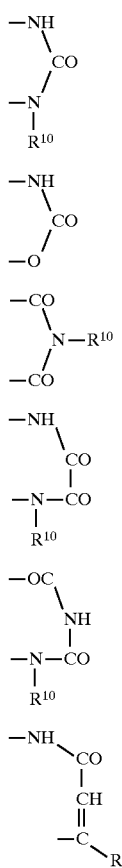

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

20. The dye as claimed in claim 7, wherein G is a group of the formula (a), (b), (c), (e), (f) or (h)

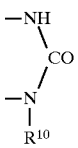

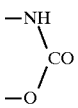

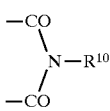

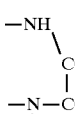

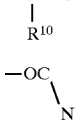

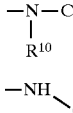

wherein $R^{10}$ is hydrogen, alkyl of 1 to 4 C atoms or is aryl of 6 to 10 C atoms which is unsubstituted or substituted by 1 to 3 substituents selected from the group consisting of sulfo, carboxy, alkoxy of 1 to 4 C atoms, alkyl of 1 to 4 C atoms, halogen, cyano, nitro and amino, and $R^y$ is hydrogen or alkyl of 1 to 4 C atoms which is unsubstituted or substituted by alkoxy of 1 to 4 C atoms, carboxy, sulfo, sulfato or phosphato, or is phenyl or naphthyl.

* * * * *